(12) United States Patent
Barnett et al.

(10) Patent No.: US 6,389,875 B1
(45) Date of Patent: May 21, 2002

(54) ZERO SPEED INDICATING DEVICES AND PROCESS OF TESTING SAME

(76) Inventors: Ralph L. Barnett, 2721 Alison La., Wilmette, IL (US) 60091; Theodore Liber, 597 Ridge Rd., Highland Park, IL (US) 60035

( * ) Notice: Subject to any disclaimer, the term of this patent is extended or adjusted under 35 U.S.C. 154(b) by 0 days.

(21) Appl. No.: 09/165,717

(22) Filed: Oct. 2, 1998

(51) Int. Cl.[7] ............................................... G01P 21/00
(52) U.S. Cl. ...................................................... 73/1.37
(58) Field of Search .............................. 73/1.37, 1.38, 73/1.39, 1.41, 1.88; 340/648

(56) References Cited

U.S. PATENT DOCUMENTS

| | | | | |
|---|---|---|---|---|
| 3,744,311 A | * | 7/1973 | Kalverboer | 73/168 |
| 4,009,603 A | * | 3/1977 | Molny | 73/1.37 |
| 4,070,901 A | * | 1/1978 | McDonald | 73/1.37 |
| 4,266,422 A | * | 5/1981 | Ullinger | 73/1.37 |
| 5,027,640 A | * | 7/1991 | Hinckley et al. | 73/1.37 |
| 6,049,284 A | * | 4/2000 | Heur | 340/648 |

* cited by examiner

Primary Examiner—Hezron Williams
Assistant Examiner—Nashmiya Fayyaz

(57) ABSTRACT

The subject invention is directed to methods, processes and decisions on test outcomes for testing for faulty, therefor dangerous, performance of zero speed indicators that are used to control the opening of barriers guarding moving machine components. The indicators may be tested by removing them from the components during operation without shutting down production or in certain situations the indicators may be tested during the run down phase of the components caused by machine stop initiations. The tests allow to anticipate and hence prevent hazardous opening of barriers due to a faulty zero speed indication. Additionally, the invention is directed to testing of the insertion of motion interference devices in conjunction with zero speed indicators, both of which must perform correctly in order to permit the unlocking and opening of the protective barrier. There are included various exemplary devices for effecting the testing function.

16 Claims, 15 Drawing Sheets

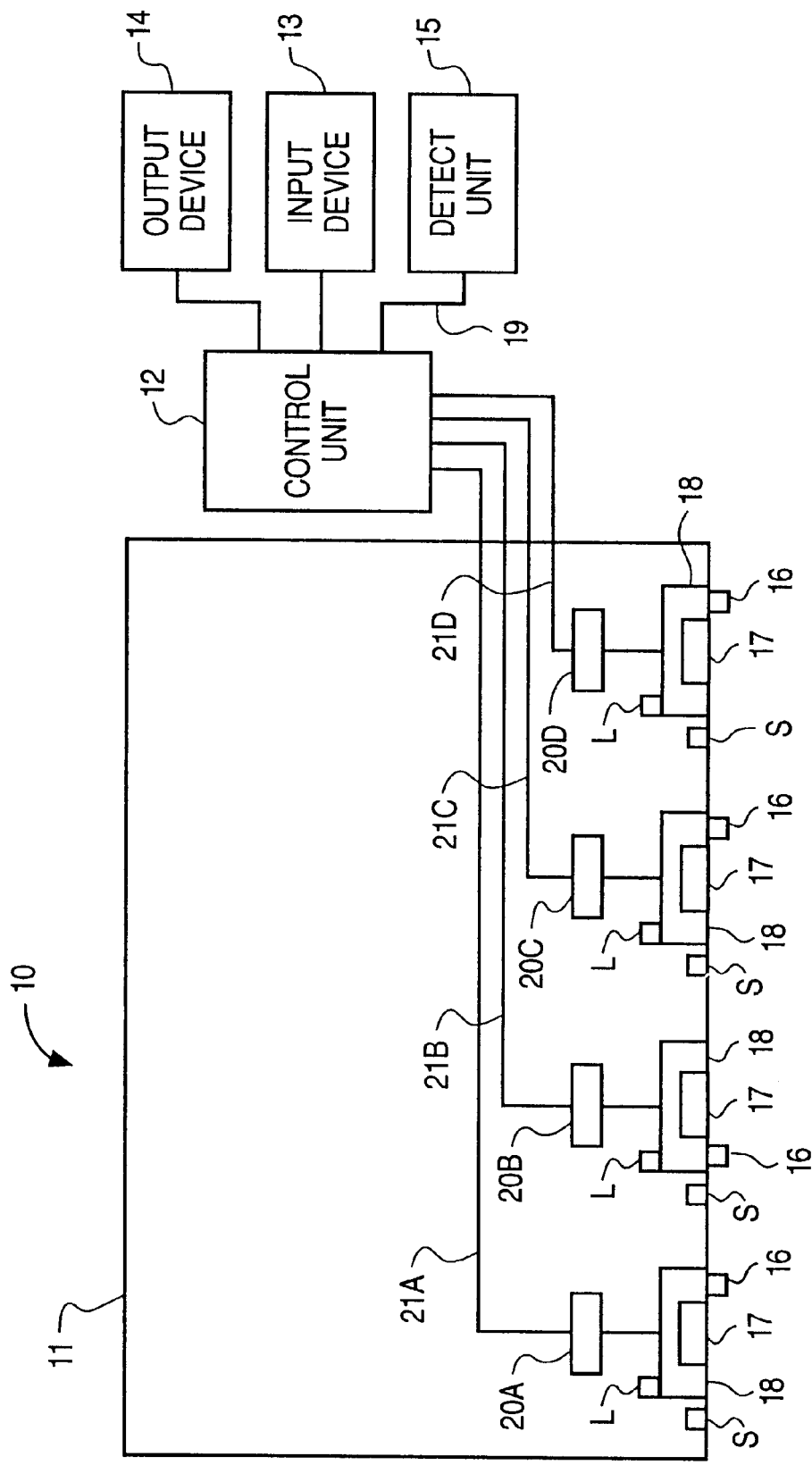

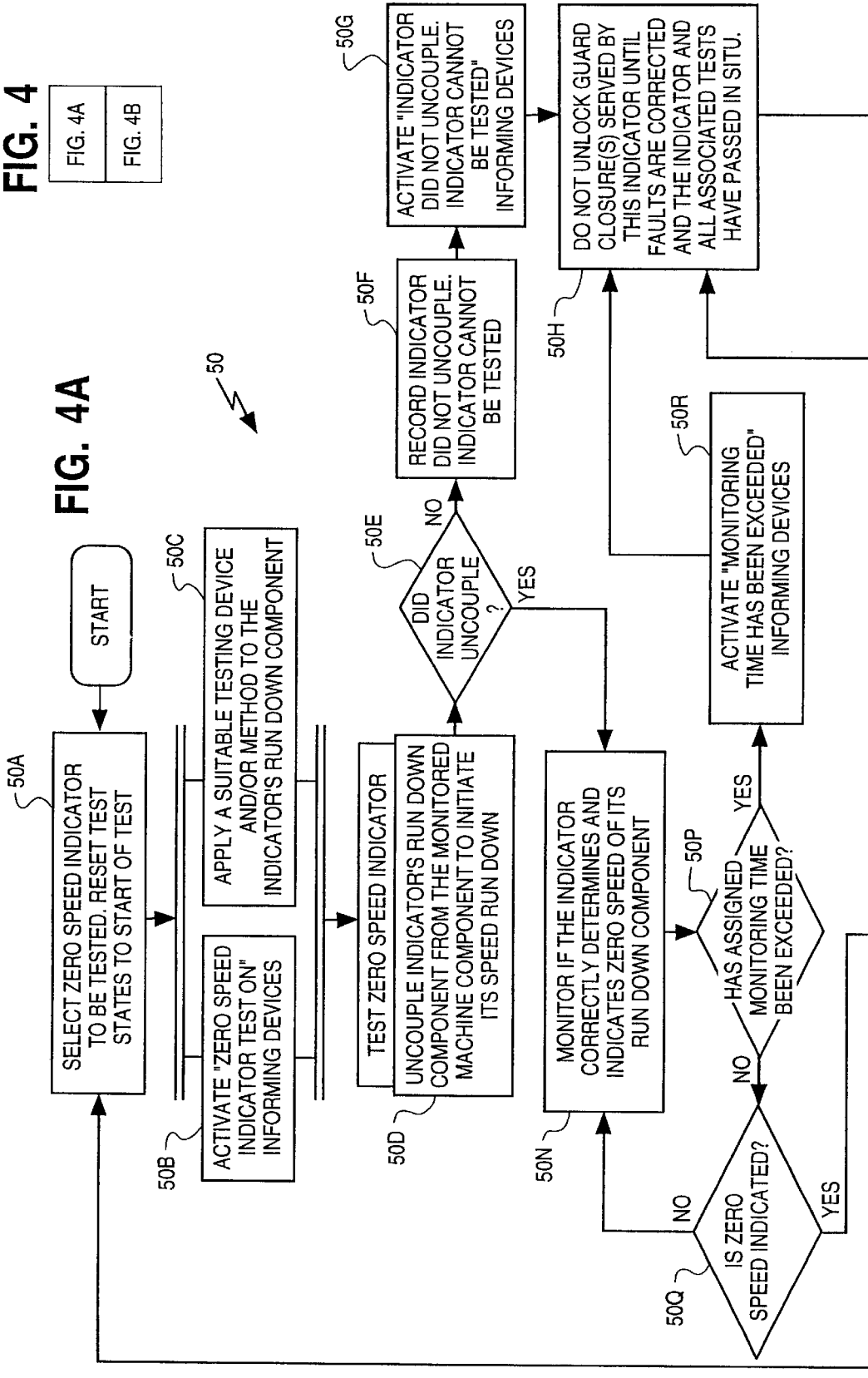

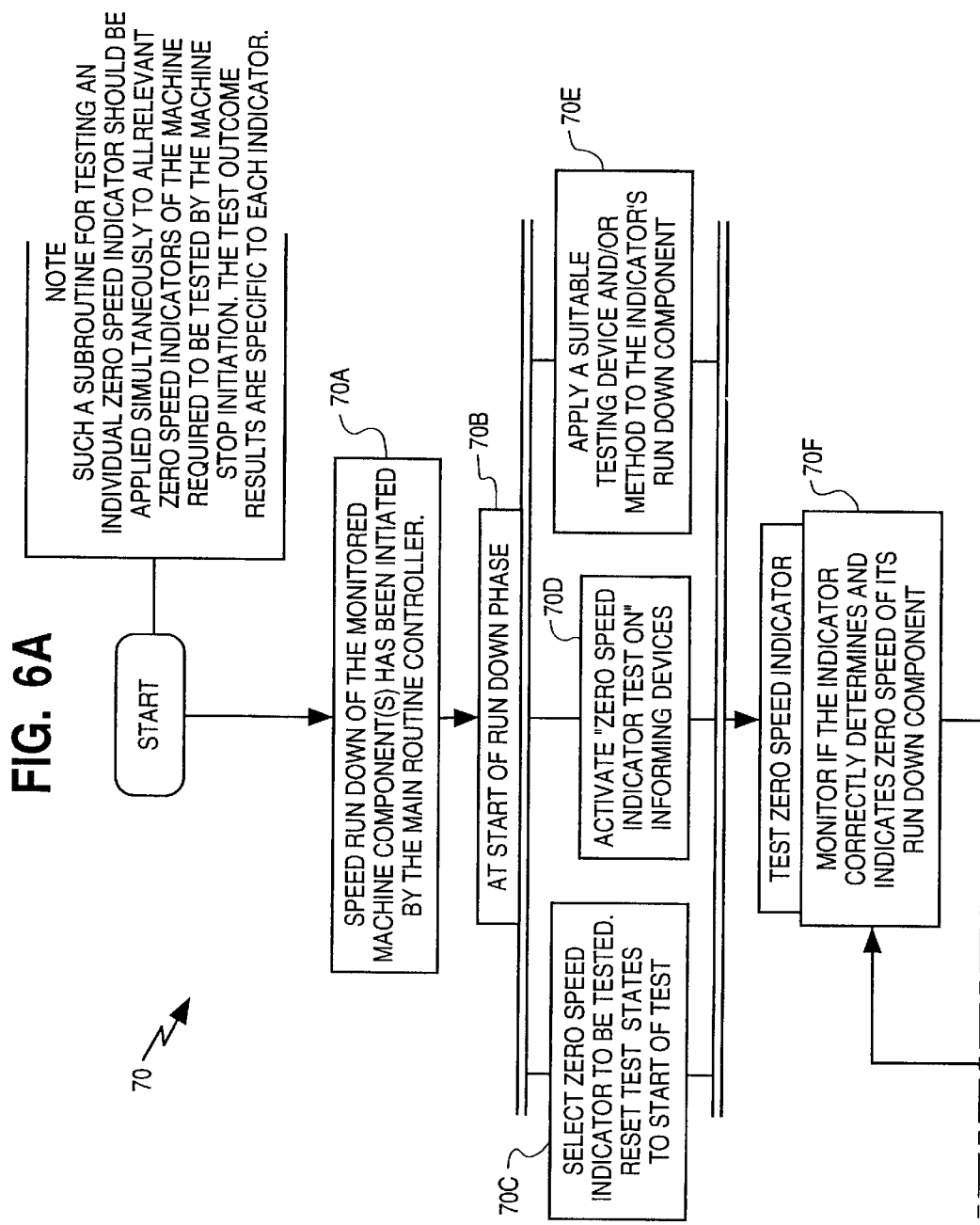

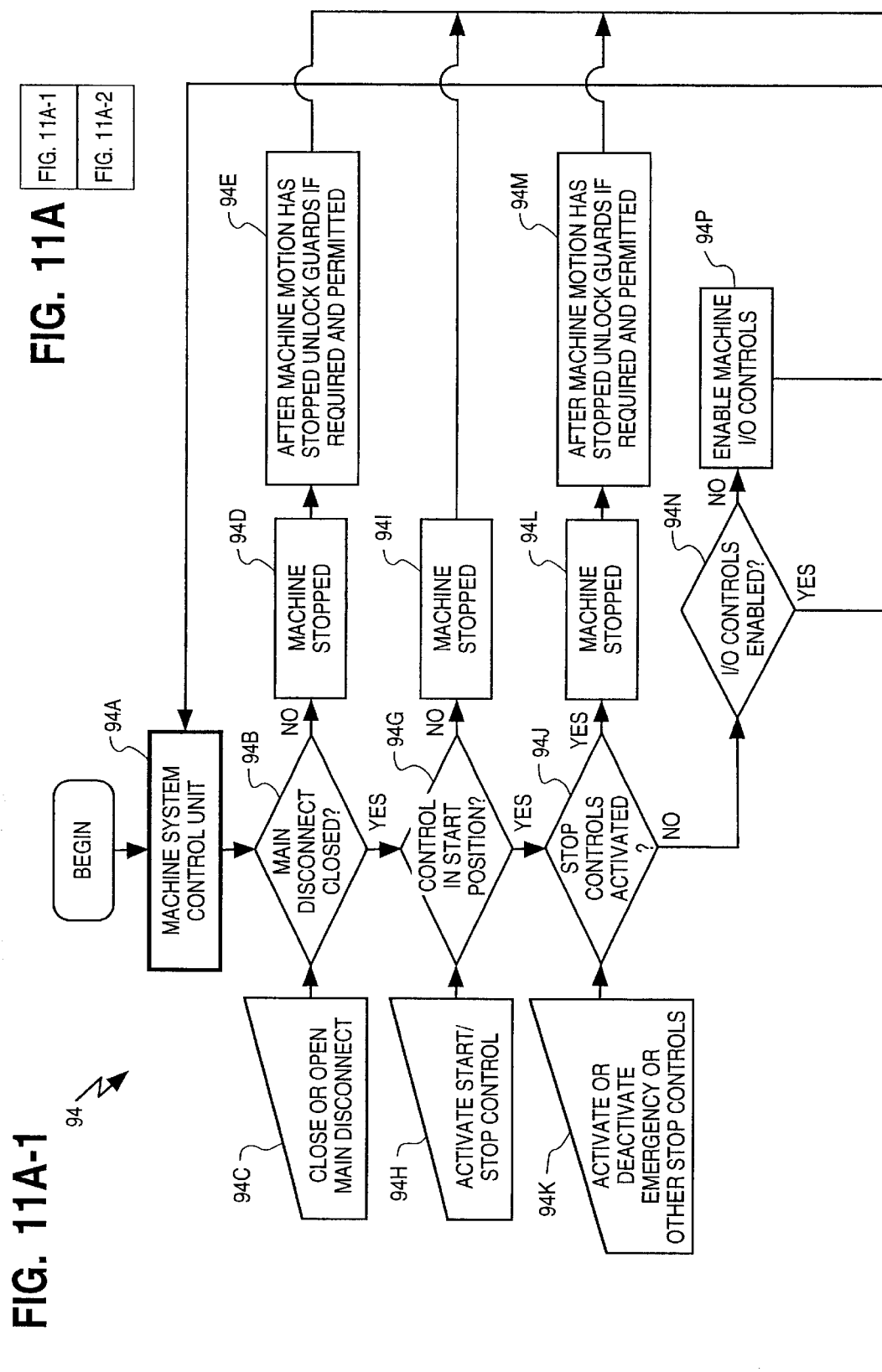

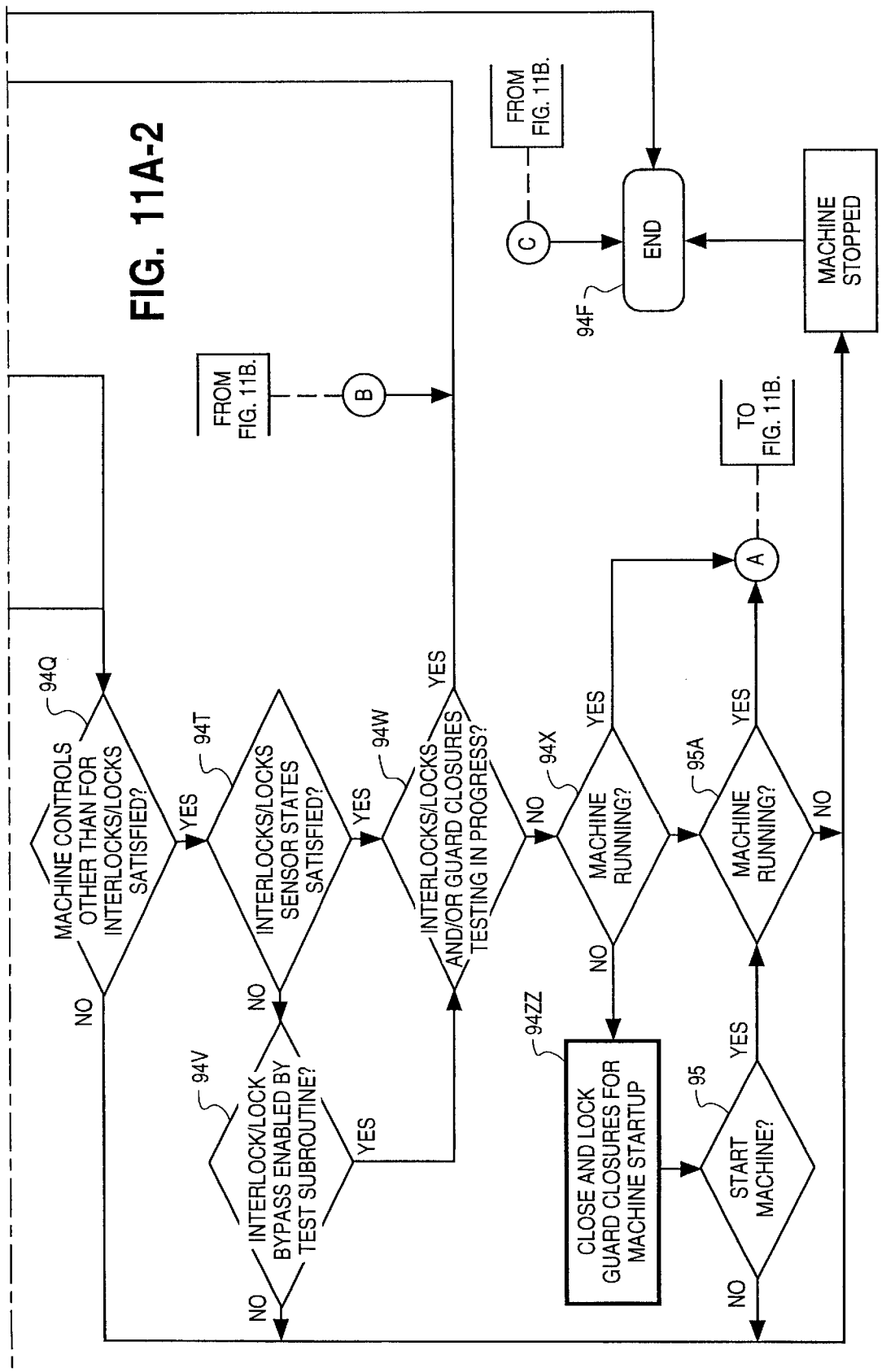

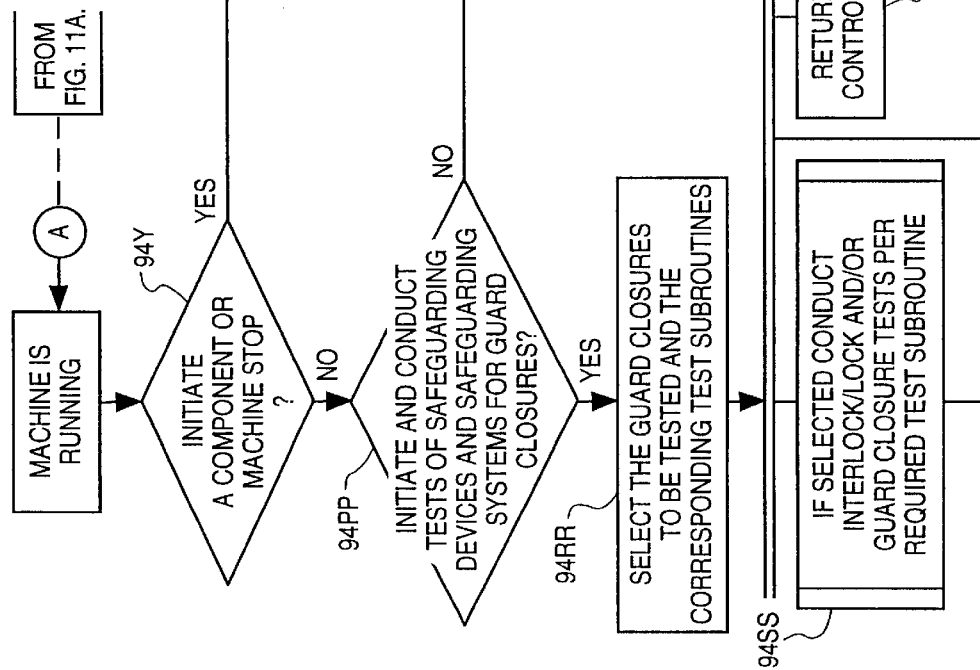

ZERO SPEED INDICATING DEVICES AND PROCESS OF TESTING SAME

THE FIELD OF THE INVENTION

This invention relates to the testing for faulty, therefore dangerous, performance of various types of zero speed indicators that are used to prevent a machine guard from being opened until the machine has come to a complete stop or has slowed sufficiently to prevent injury to anyone intending to access or work on the machine in the guarded space. The testing methods, devices, processes and decisions on test outcomes, are constructed and arranged so that the indicators can be tested while the machine is running, preventing unnecessary production interruptions and machine shutdowns, as well as take advantage of scheduled and unscheduled machine shutdowns to perform the tests. By performing these tests the hazardous opening of a guard due to a faulty zero speed indication can thus be anticipated and prevented.

For additional safety, machine guard protective systems will sometimes utilize motion interference or blocking devices which are inserted in the motion path of a component of the stopped machine so that machine motion cannot take place while the guard is open. The present invention further relates to the testing of the insertion of motion interference or blocking devices in conjunction with zero speed indicators, both of which must perform correctly in order to permit the unlocking and opening of the guard.

BACKGROUND OF THE INVENTION

Barrier guards, shields, covers, screens and the like are among the oldest known safeguards for protecting personnel from the hazards of moving machinery. Their effectiveness derives from three properties: they prevent entry of the body into the zone of operation, they retain expelled missiles, and they define the safe from the unsafe portions of the machine. The need to access machinery leads to the removal or openings of barriers whereupon their concomitant protection is lost. Heretofore the shortcomings have been addressed by interlocks, which provide a connection between a barrier and the control or power system of the machinery to which the barrier is fitted. The interlock and the barrier with which it operates is designed, installed and adjusted so that until the barrier guard is closed into its protective state the interlock prevents the machinery from operating by interrupting the power medium and also so that opening of the barrier causes the hazard to be eliminated before access is possible or it may be necessary that the barrier remain closed and locked until the risk of injury from the hazard has passed.

The barrier locking system wherein the barrier is to remain locked until the risk of injury from the hazard has passed is necessary when either 1) simply opening or removing the guard does not eliminate the hazard before access is possible or 2) opening a guard other than at predetermined points in the machine cycle may expose the hazard.

The guard locking system will normally consist of a timing device or motion or position sensing device and a guard locking device. These may be individual units or combined in one assembly. Variable conditions of operation of machinery produce variable amounts of run down and in these circumstances a timing device may be inappropriate to determine when the run down has reached a non-hazardous state since it has to be set for the longest run down time that might be expected. The variable time element may, however, be eliminated by the use of a motion or position sensing device, which allows the guard to be opened as soon as the hazard is no longer present.

Available on the market today are a number of position, motion, timing and guard locking devices that operate on various principles. Among motion and position sensing devices some may suffer from the disadvantage that they show poor response at low speed and are therefore acceptable only where residual motion after the guard has been opened could not cause injury. On the other hand, where injury could result from residual motion, more sensitive devices and or timing devices may be necessary. Examples of typical motion or position sensing devices are a) rotation sensing devices that may operate on centrifugal force, friction , eddy current generation, voltage generation, optical or electronic pulse generation b) photo-electric beam c) proximity devices or d) position switches or valves.

Timing device examples include a) mechanical electrical or electronic clocks b) delay relays c) sequence valves d) threaded bolt or e) a dashpot.

Examples of typical guard locking devices are a) a captive-key unit b) a trapped-key unit c) mechanical bolt or d) shotbolts which may be solenoid operated, hydraulic or pneumatic.

The present invention relates to the testing of motion sensing devices that indicate zero speed or the cessation of motion. These devices actively monitor moving machine elements and are never benign when the machine is active. Such indicating devices may wear out or get out o f adjustment or otherwise fail by prematurely signaling that motion has been arrested. This leads to unlatching of the barrier guards before the motion has ceased and before entry to the protected regions is safe. A statistically significant number of people will depend on the efficacy of the motion detectors to unlock guards when it may not be safe to do so.

To help prevent a false sense of security, it is desirable to improve the reliability of motion detectors and reliance thereon by regularly testing them. The dependence on zero speed systems is entirely analogous to the public's reliance on the "safety edges" on ordinary elevator doors.

Zero speed indicators may be completely removed from machines and tested by methods specified by the manufacturers. This procedure is practical only when infrequent inspections are anticipated and when the safety of the basic machine is not compromised by the removal of the motion indicator such as during a general machine shutdown.

The present invention describes a process whereby the motion detectors are frequently and automatically tested in situ while the machinery is in motion (and production) and while total personnel protection is assured. A further novel process is envisioned where the motion detectors are automatically tested in situ whenever the machine is shut down, such as when control systems stop switches are activated for lunch breaks, routine cleaning, maintenance or end-of-shift, when emergency stop devices are employed, when power disconnect is effected; or when latchless interlocked barriers are opened. In addition, when the motion detector indicates that the moving parts have stopped, it may be desired that absolute safety he insured by requiring a motion blocking member to be insertable and inserted between the now stopped moving parts before a guard protecting such parts can be opened.

SUMMARY OF THE INVENTION

There are many applications of safety closures or barriers that must remain closed and locked until the dangerous components that are guarded come to a stop. In such situations it is usual to employ run down completion detection devices such as motion detectors, zero speed switches indicators or detectors, timing devices, delay devices, interference devices, and motion blockers to make a final check to determine that the machine has in fact come to the required stop.

The present invention is directed to the testing of zero speed indicators and the incorporation of interference or motion blocking devices into the overall testing process of guard closures whether such closures are used separately from or in conjunction with interlocks, closure locks, zero speed indicators, and various testing devices. The testing, methods of testing, testing process, testing systems and devices for interlocks, guard closures and closure locks have been extensively detailed in two patent applications filed in the names of the two inventors of the present invention. These applications are incorporated by reference into the present application and set forth in detail the testing, methods of testing, testing processes testing systems and devices for interlocks, guard closures and closure locks. One application has Ser. No. 08/861,328, filed on May 21, 1997 now U.S. Pat. No. 5,870,317, entitled REMOTE AND PROXIMAL INTERLOCK TESTING MECHANISM AND TESTING SYSTEMS. The other application has Ser. No. 09/033,322 and was filed on Mar. 2, 1998 and is entitled REMOTE AND PROXIMAL GUARD TESTING SYSTEMS AND TESTING SYSTEMS EITHER SEPARATELY OR IN CONJUNCTION WITH INTERLOCK TESTING MECHANISMS AND SYSTEMS.

By way of reference, the above patent applications disclose the methods and means for testing in situ of guard interlocks, guard closures, and closure locks on machines, without stopping the machine or interrupting production to perform the tests, and the detection by the test of a fault in any of them does not lead to stopping of the machine unless so desired. If the machine is permitted to continue to run after the testing detects a fault or faults, remedial actions can be instituted to postpone repairs of the failures to a future convenient time. The interlocks are tested to determine whether any of them have failed, hence will not perform, as they should when called upon to execute their intended safeguarding functions. The guard closures are tested to determine whether any of them can be opened when they should be closed and locked to alert against a false sense of security that entry into the hazardous spaces they are meant to protect is prevented when it is not. The failure to prevent the guard closure from opening can be due to various causes. One of these can be the failure of its lock to keep the guard closure "shut" disclosing both a closure failure and a lock failure. Closure locks are also tested by direct means.

A zero speed indicator essentially consists of a device that will detect and indicate when the machine component speed it is measuring has come to the required stop, i.e., either has been reduced to zero or where applicable to a value sufficiently close to zero determined to be nonhazardous to personnel contact. In the present invention, unless otherwise indicated the term zero speed and its variants, means the required stop as defined above, and zero speed detectors are also zero speed indicators with both terms used synonymously. Furthermore, any one zero speed indicator may serve more than one guard closure protected space. Therefore, statements referring to one zero speed indicator and a guard closure and/or closure lock served by it, should be understood as referring to all guard closures and/or their locks served by the zero speed indicator.

The zero speed indicators are in some manner attached to the moving part of the machine being guarded and will be indicating the movement of the machine, and thus if they reflect a zero speed reading the guard may be opened. However, to open the guard with impunity it is essential that the zero speed indicators be periodically tested to make sure that when one relies on its indication of zero speed that in fact the machine has come to the required stop.

Normally, a zero speed indicator is attached to or driven by any component of a moving machine whose speed is proportional to the speed of the hazardous elements that require protection by guard closures. As the motion of the monitored component decreases to zero, the zero speed indicator has an opportunity to detect and signal the achievement of the required stop motion which, in turn, becomes a permissive or necessary condition for unlatching the guard closure.

The present invention includes a first novel process for testing the accuracy and reliability of the zero speed indicator while the machine component is running under power. In this process the zero speed indicator is temporarily uncoupled in situ, i.e., isolated from the monitored component by removing it or by declutching it from the component or by any other suitable means. Without the driving impetus from the machine component, the zero speed indicator will eventually run down to the required stop motion. If desired, the zero speed indicator may be decelerated by braking devices to save time. If the zero speed indicator is a device without integral speed rundown components, e.g. a photoelectric device, then such a zero speed indicator will have to be provided with a speed rundown component as part of the test setup. In the isolated state any known suitable testing methods or devices may be used to verify the accuracy of the zero speed indicators. If the zero speed indicator fails to operate properly, the guard closure lock should remain latched for the sake of safety until a repair has been completed. It may also be desirable to actuate "test failed" warning indicators and devices, and in some circumstances, it may be desirable to shut the machine down while maintaining the interlock function and unlatching the guard closures so that maintenance may proceed unencumbered.

In accordance with the present invention the first novel process provides for testing the motion indicators in situ for accuracy and reliability, while the protected machine components are running under power. If the test determines that a motion indicator of a guard protected space will fail to indicate correctly the occurrence of a safe stop, it provides the great advantage of detecting this in advance of allowing a prospective opening of the guard and gives early warning of this prospective safety failure. With such warning available steps can be instituted and devices provided to maintain the protective guard locked, preventing a future entry into the hazardous space until a scheduled repair or replacement of the faulty motion indicator takes place. In contrast, the reliance on the motion indicator's correct performance without testing it in advance fosters a false sense of security, and leads to the concomitant hazard of prematurely allowing a prospective entry into the guard protected space. With the preventive steps in place, the entry protection of the guarded space is secured, and the machine need not be stopped nor production disrupted upon detecting the motion indicator's failure. Likewise, the machine can be stopped and allowed to be safely restarted as long as the access to the hazardous space continues to be barred. Repair and replacement of the failed motion indicator can be scheduled for whatever time is appropriate. The aforementioned novel process is designed to provide all of these novel advantages otherwise absent without it.

It should be noted that the novel motion detector verification test method or device used in the proposed process is not equivalent to a zero speed indicator system with a redundant motion indicator. Regardless of the level of redundancy, without the novel process of the present invention, failure of a motion detecting system can not be determined while the machinery is in powered operation. Consequently, advanced warning of such failure and the deployment of associated counter measures will not be possible.

In accordance with the present invention there is also provided a second novel process for testing zero speed indicators without interrupting the operation or production capability of the machine and without the need to uncouple the zero speed indicator from the monitored component.

This novel process applies to machines that operate with intermittent dangerous motions. Their zero speed detectors can readily be tested during the motion run down phase when the intrinsic or natural movements in the points or zones of operation are caused to come to rest as required by the machine operation process. An example may be found in the power press operating in the "single stroke" mode where its state repeatedly moves between clutching and declutching and braking.

In this regard it is important to note that every moving machine element has a "speed run down" phase when required to stop. Therefore, the operation of zero speed indicators during intermittent stops are intrinsically no different than during any other machine stops.

Specifically, continuously operating machinery that are monitored by motion detectors achieve a state of rest whenever control stops are initiated or when emergency stops are executed or when lockout procedures call for power interruption. In such instances. analogous to the intermittent motion machines, it is possible to test the zero speed indicators during the machine's run down to the state of rest without interrupting production or uncoupling of the zero speed indicators from the monitored components.

In the above referred to applications for testing zero speed indicators when machine stops are initiated a variety of known suitable testing methods or devices may be used to verify the accuracy of the zero speed indicators during the machine run down phase, including those employed for such verification testing in the first novel invention process previously described. Failure of the zero speed indicating system detected by the verification test will preclude the unlatching of the lock or locks of the guard closure or closures it serves. Only after repairs or replacements have restored the reliability of the motion detector to correctly indicate zero speed will it be trusted to give permission to unlatch the locks. With their guard locks latched, the affected hazardous spaces remain protected, denying entry to personnel. Hence the machine can be restarted and production can continue in spite of the presence of a known faulty motion detector. Furthermore, the repairs or replacements of the faulty motion detector can now be scheduled for what ever time is suitable.

Thus, the aforementioned second novel process provides for testing of the motion indicators in situ for accuracy and reliability, and the testing to be done while the protected machine components are in the "running down" phase of a stop initiation. T his provides the advantage of being able to detect if a motion detector will fail to indicate correctly when the safe stop of the running down phase will occur, and to warn thereof in advance of a prospective opening of the guard. Having such warning available, steps can be instituted and devices provided to maintain the protective guard locked when such failure is detected, preventing entry into the hazardous space until a scheduled repair or replacement takes place, or until assurance is gained by other means that a safe stop is present. In contrast, the reliance on the motion detector's correct performance without testing it fosters a false sense of security, and leads to the concomitant hazard of prematurely allowing entry into a guard protected space. With the preventive steps in place, the entry protection of the guarded space is secured and the machine can be stopped and allowed to be safely restarted to continue production as long as the access to the hazardous space continues to be barred. Repairs and replacements of the failed motion indicator can be scheduled for whatever time is appropriate. This novel process is designed to provide all of these novel advantages otherwise absent without it.

A third novel aspect of the present invention is associated with the insertion of blocking devices into the points or zones of operation or into synchronized power trains that will absolutely prohibit dangerous machine motions.

Interlocked and locked guard closures with zero speed monitoring capability are intended to protect personnel from hazardous moving mechanical elements regardless of whether the motion is attributable to external power sources or internal stored energy. Access to the operational zones protected by guard closures is granted only after hazardous motion has subsided. As a final step in operator protection, this invention anticipates situations where an interference system will be deployed in synchronized power transmission trains or into the zone of operation that will prevent all movement before a guard closure lock unlatches and allows the operators to place their bodies into the hazard zone. Die blocks and props are typical interference devices used in zones of operations. Application of the interference system must be preceded by the establishment of zero motion by a zero speed detection system. In the usual case, the zero speed system unlatches the guard closure lock once the motion ceases. The third novel invention will require that the guard closure locks do not unlatch and only permission to unlatch is granted by the zero speed system when it indicates that motion is terminated. Guard closure locks will then unlatch only if interference devices are fully inserted or deployed and if the associated protective status is communicated to the machine controller.

In summary, the third mentioned novel invention process operates as follows: When the zero speed detection system issues a signal that the motion has ceased the signal is to be utilized to command and execute the insertion of a motion interference device as a precursor to the unlatching of any interlocked and locked guard closures protecting the point of operation. This insertion will prevent, due to any cause, any motion to be present or resumed in the dancer zone after the guard closure has been unlatched and opened for access. If, after the zero speed signal has been issued, the interference device can not be inserted the most likely reason is that at the time of insertion zero motion was not present as indicated and that the motion hazard continues. This serves as a signal not to unlatch the guard closure.

The ultimate guard closure system contains interlocks and interlock testing systems, zero speed monitors with testing capabilities, guard closures with guard closure testing systems, locks with lock testing systems and interference devices with their testing systems. Unlatching of the guard closure usually requires the essentially simultaneously fulfillment of the following necessary conditions, 1) tests on guard closure locks have been passed, 2) tests on guard closures by force displacement devices have been passed, 3) tests on interlocks have been passed, 4) tester probe tests have been passed, 5) tests on zero speed indicators have been passed, 6) tests on timer or delay devices have been passed, 7) tests on interference systems have been passed, 8) machine power has been interrupted by control stop signals, emergency stop devices or by power disconnect, 9) zero speed systems give permission to unlatch and, 10) interference devices are fully deployed.

In order to better understand applicant's invention there will be schematically illustrated and described systems employing motion detectors for indicating when the machine components have completed their run down and systems for testing the zero speed indicators without shutting the machine down. This may or may not include isolating the motion detector from the machine during testing depending on the system employed. In addition, an apparatus will be described wherein an interference device is inserted to prevent accidental resumption of motion after all motion has ceased when zero speed is indicated.

In order to better understand applicant's invention there will also be described in detail hereinafter flow charts illustrating an example of a main routine for the testing of safeguarding devices and systems for guard closures as well as a number of subroutines. The subroutines include 1) a zero speed indicator test subroutine for in situ testing while the machine is running; 2) a zero speed indicator test subroutine for in situ testing during the speed run down phases caused by machine stop initiations; 3) a subroutine in which there is insertion of a motion interference device at the completion of the speed run down brought about by initiating stopping of the machine and 4) a subroutine for checking the fulfillment of the necessary conditions for unlatching a guard closure.

BRIEF DESCRIPTION OF DRAWINGS AND FLOW DIAGRAMS

The following drawings and flow diagrams show the applications, methods, concepts, processes and execution of the present novel inventions.

FIG. 1 is a schematic view of a machine control arrangement including a safety control arrangement and a zero speed indicator testing system;

Figure 2A:
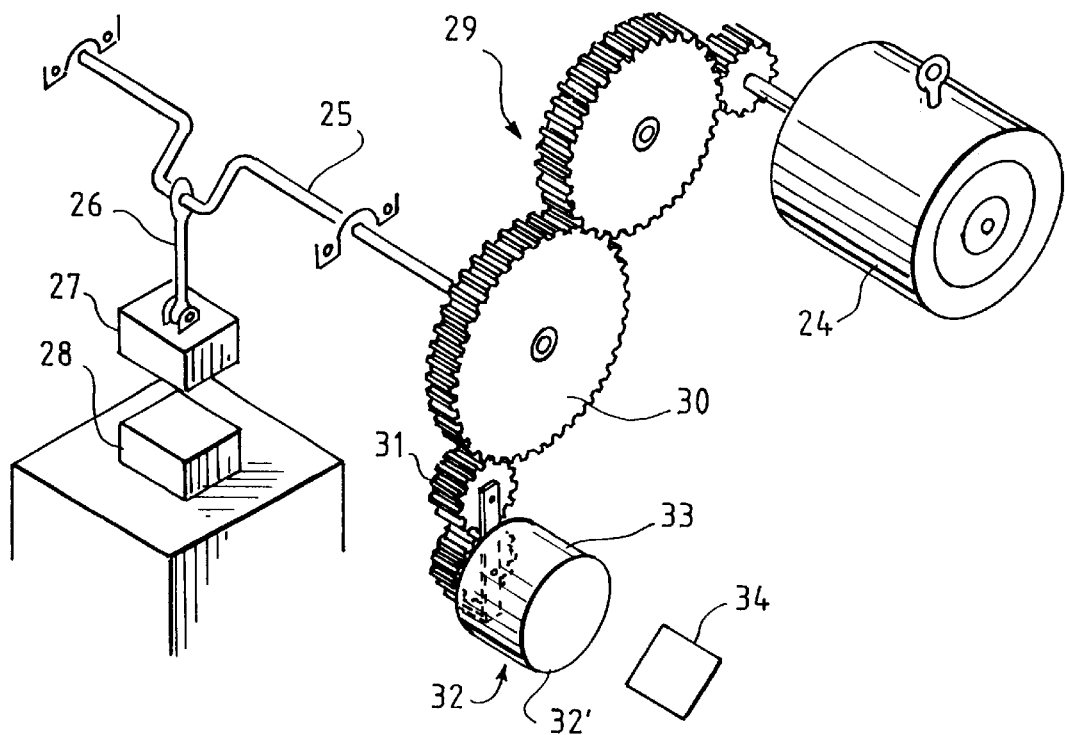
FIG. 2A shows a zero speed indicator assembly connected to the driving mechanism of a press, where the indicator assembly is to be tested in situ during running of the machine without its shutdown, by temporarily detaching the indicator assembly in situ from the driving mechanism.
Figure 2B:
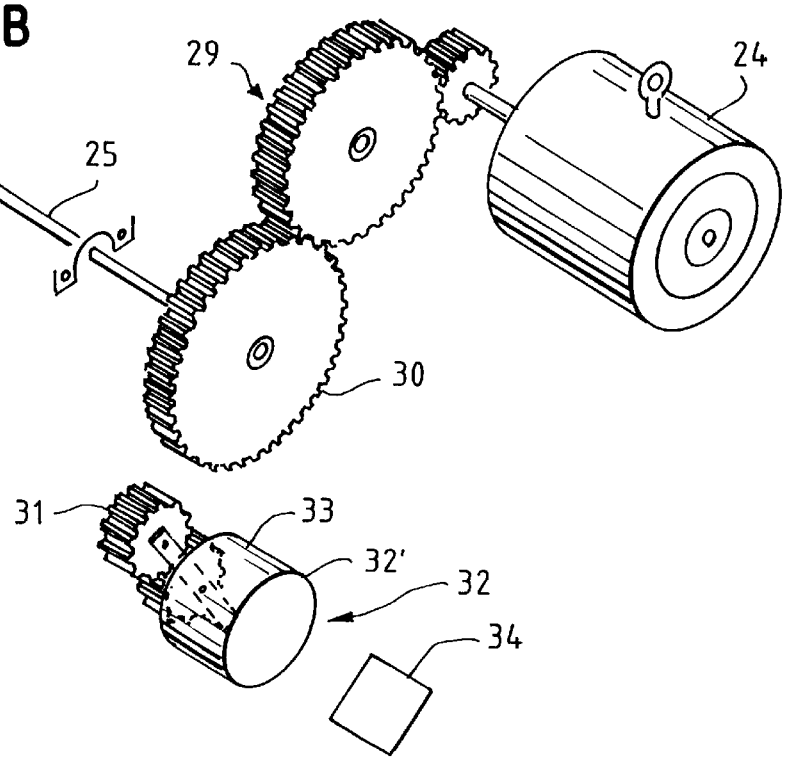
Figure 3:
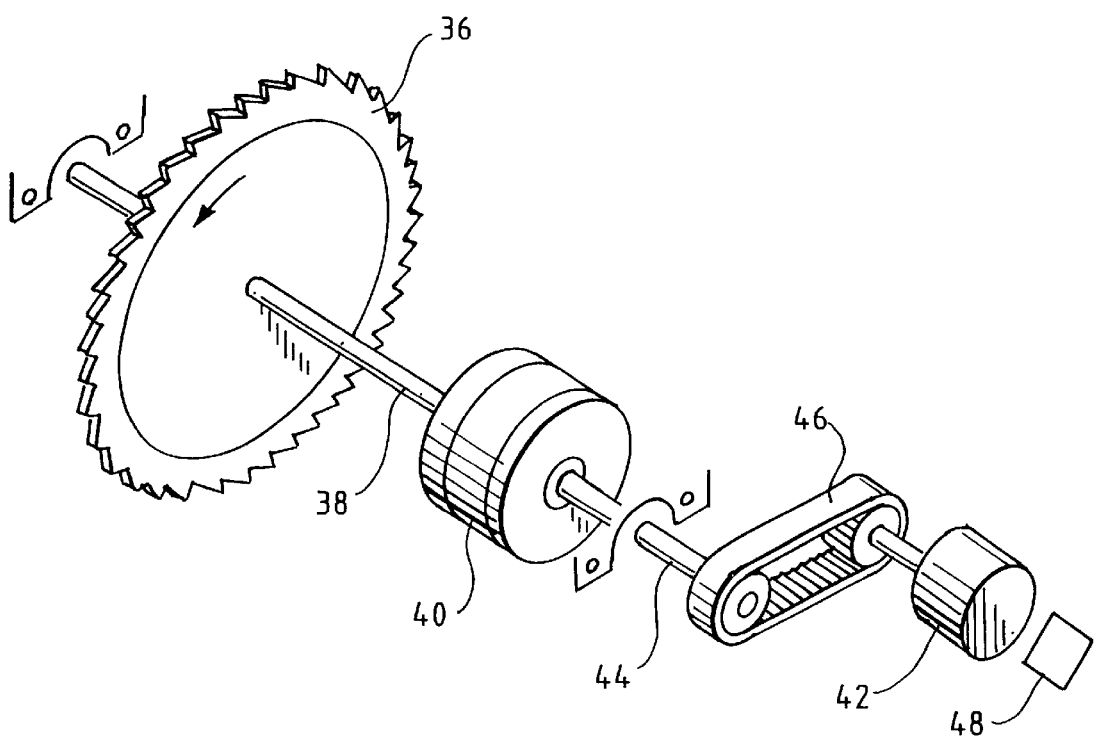
Figure 4B:
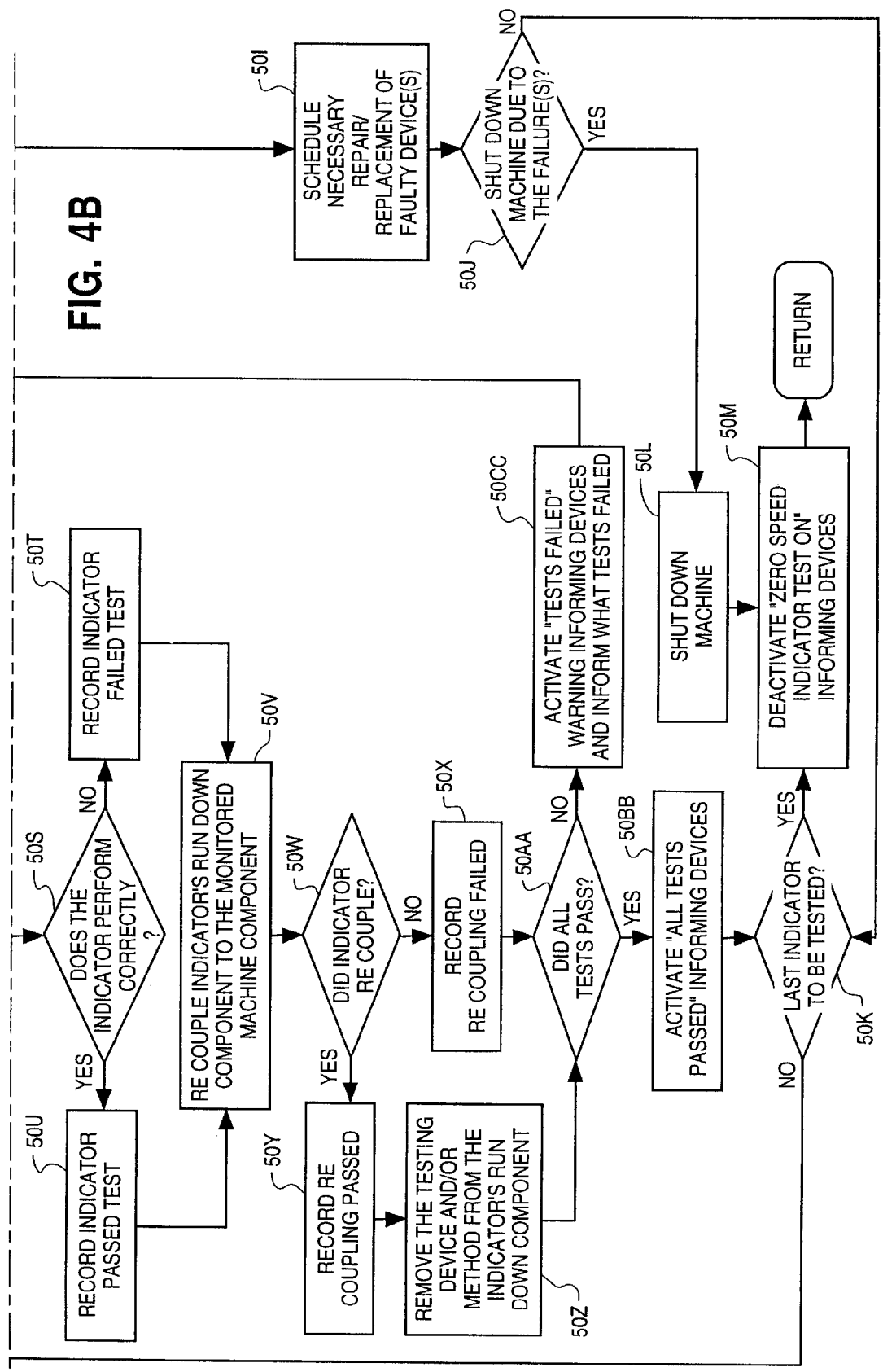
Figure 5:
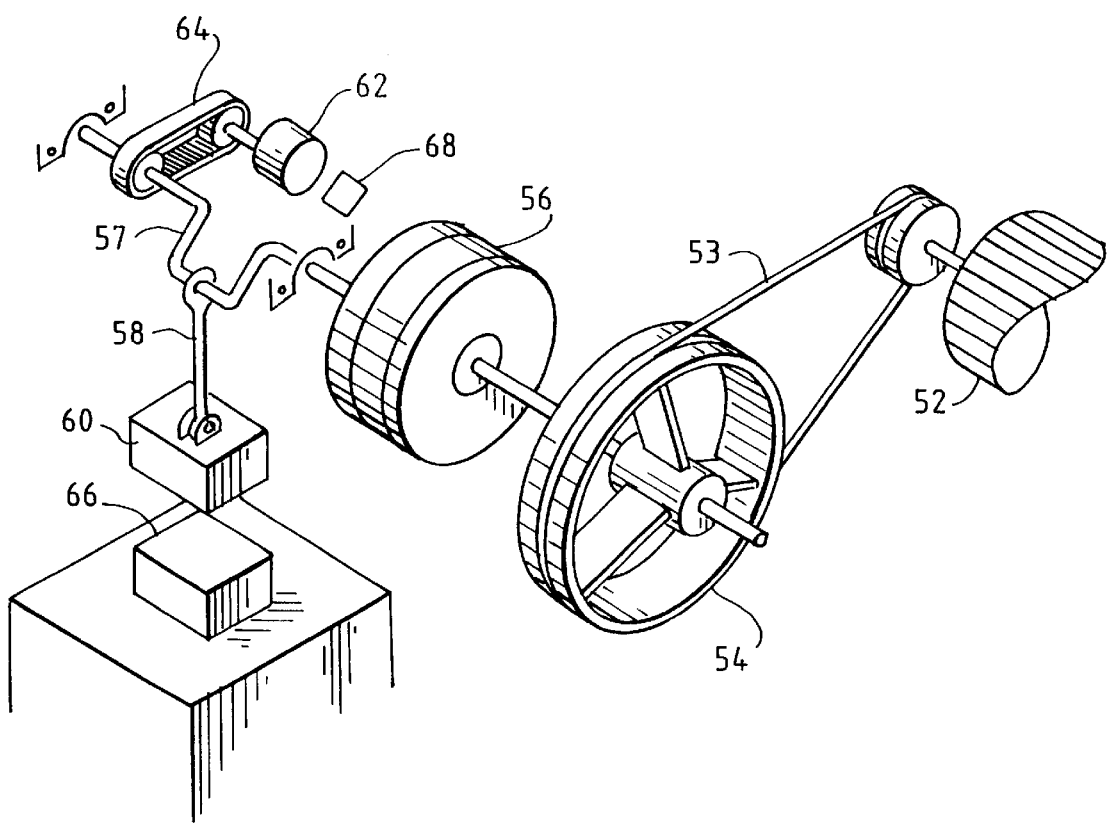
Figure 6B:
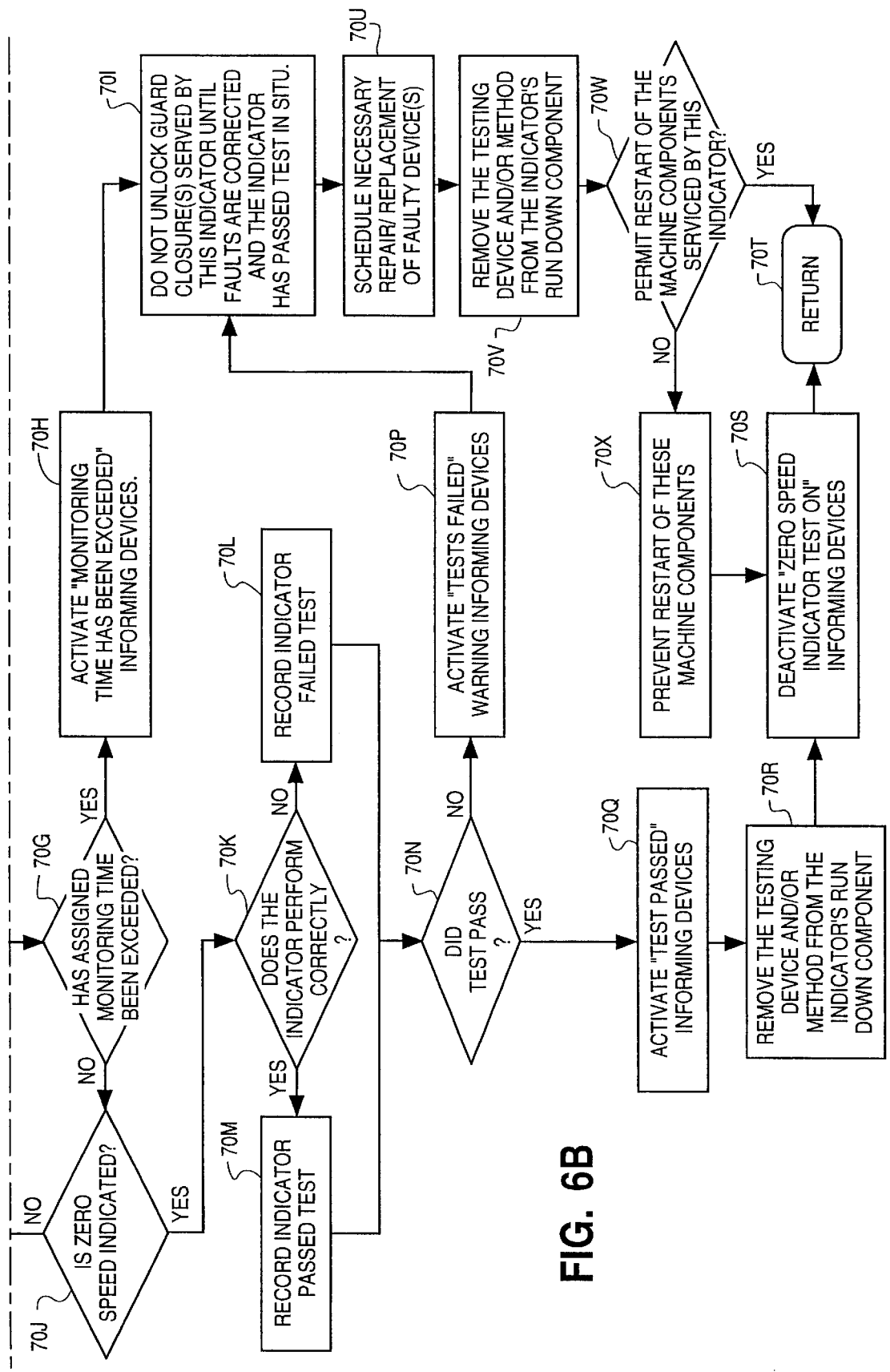
Figure 7:
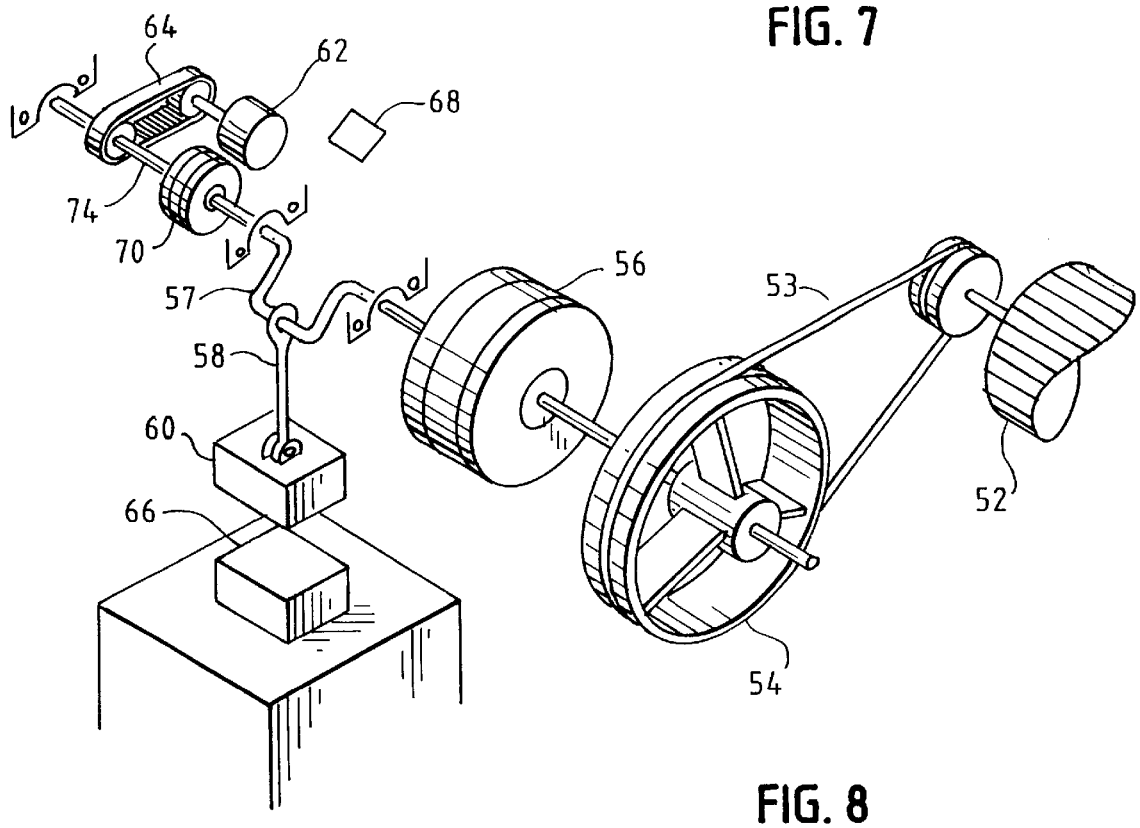
Figure 8:
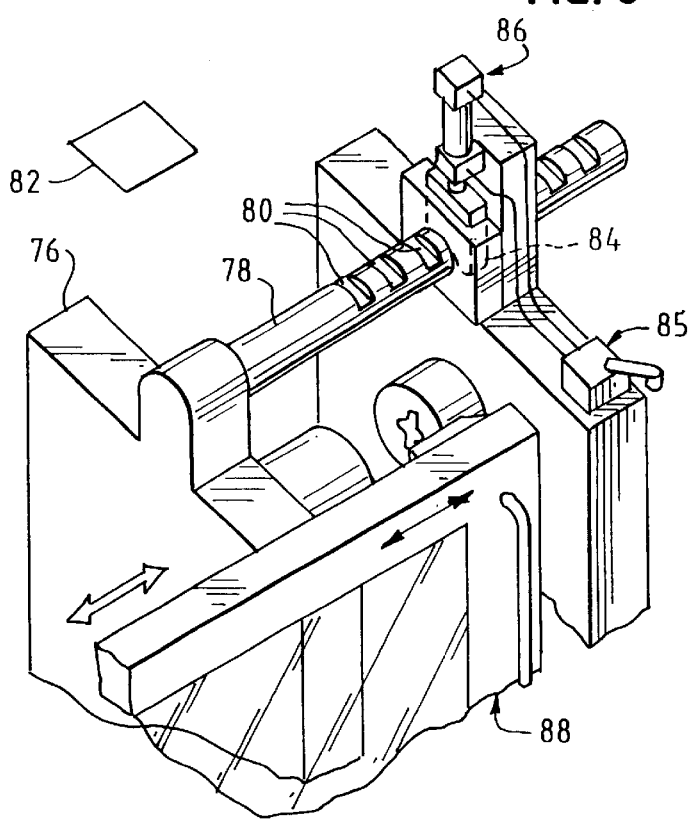
Figure 9:
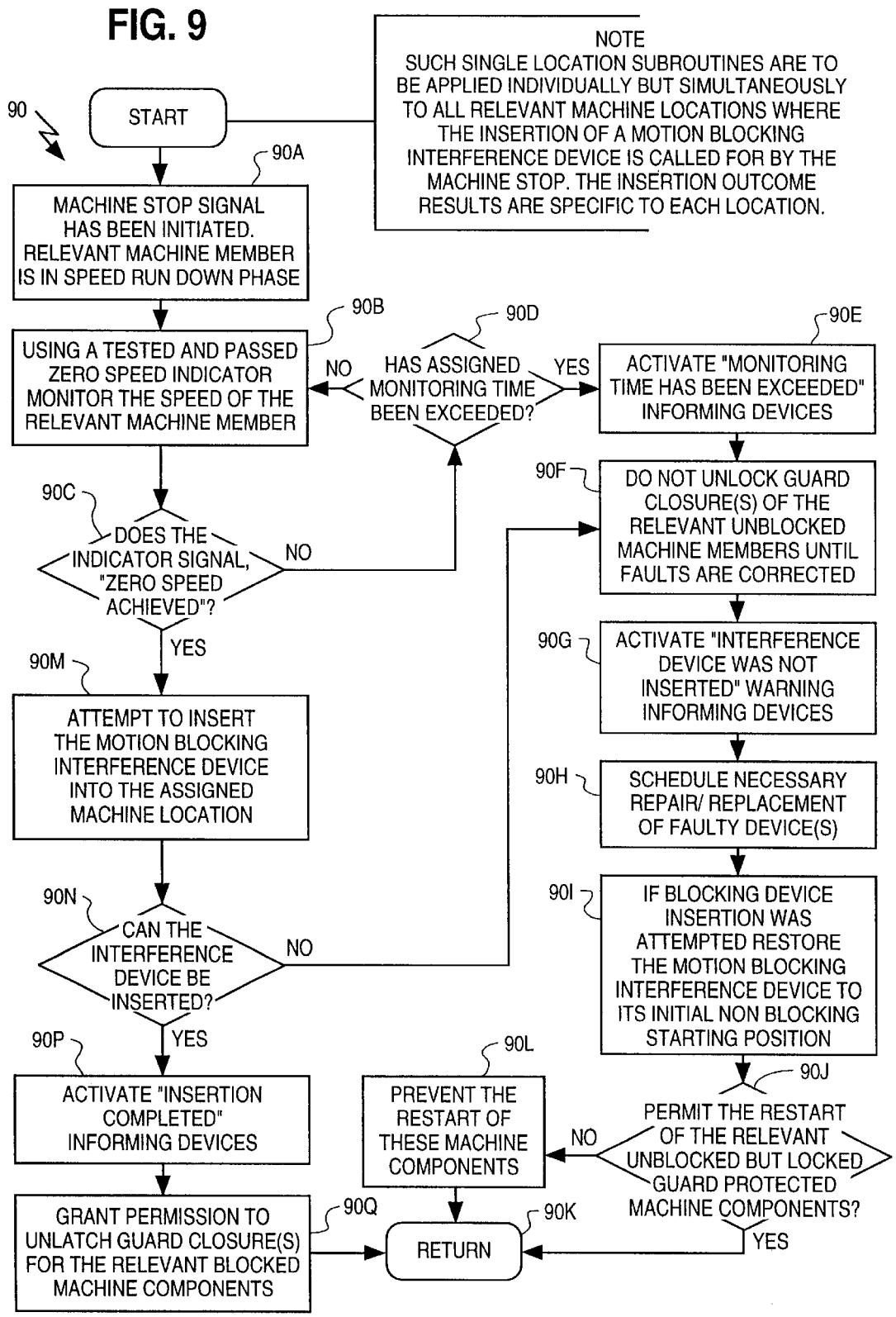
Figure 10:
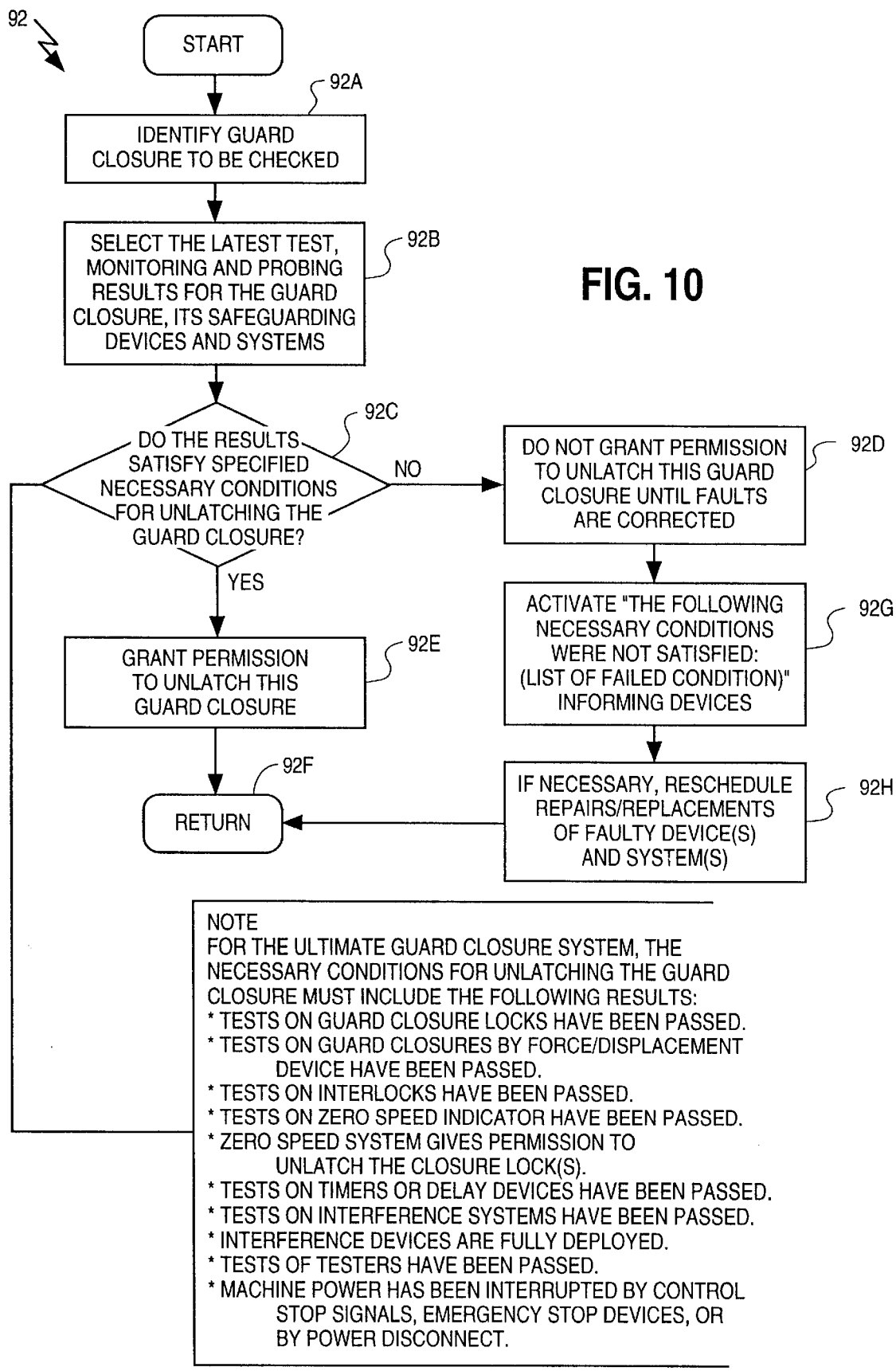

FIG. 2B shows the zero speed indicator assembly of FIG. 2A temporarily detached in situ from the press driving mechanism, in which position the indicator assembly can be tested while the machine can continue to operate, FIG. 3 shows a zero speed indicator connected by a clutch/brake timing belt unit to the driving shaft of a continuously running circular saw system, wherein by temporarily declutching the indicator timing belt drive shaft from the saw drive shaft and applying the brake to the timing belt drive shaft the indicator can be tested in situ during running of the saw without its shutdown:

FIGS. 4A and 4B illustrate a flow diagram of a subroutine for in situ testing zero speed indicators while the machine is running;

FIG. 5 shows a zero speed indicator connected to the driving mechanism of a press, requiring intermittent type of operations wherein the indicator without uncoupling can be tested in situ each time the ram crank shaft is braked to a stop required by an intermittent task of the press operation, as well as during scheduled and unscheduled stop initiations of the press power drive itself;

FIGS. 6A and 6B illustrate a flow diagram of a subroutine for in situ testing zero speed indicators during the speed run down phases caused by machine stop initiations;

FIG. 7 shows the system of FIG. 5 equipped with a separate clutch/brake unit for the zero speed indicator, whereby it illustrates that combining methods and systems of this invention enables the testing of zero speed indicators in situ both while the machine is running and during machine stop initiations using a single test system;

FIG. 8 discloses a system wherein when the guarded machine members reach zero speed a motion interference device is inserted to insure that it is absolutely safe to open the guard closure;

FIG. 9 is a flow diagram of a subroutine for insertion of a motion interference device at speed rundown completion caused by machine stop initiations;

FIG. 10 is a flow diagram of a subroutine for checking the fulfillment of necessary conditions for unlatching a guard;

FIGS. 11A–1, 11A–2, 11B–1 and 11B–2 are an example of a main routine for testing safeguarding devices and systems for guard closures that utilizes the subroutines of FIGS. 4A and 4B, 6A and 6B, 9 and 10.

DESCRIPTION OF THE PREFERRED EMBODIMENTS

The novel inventions disclosed herein relate to safety guard systems that employ zero speed indicators that are utilized to indicate when the speed of the machine components they are guarding have come to the stop required for the safe access to the guarded space, thereby either permitting or actually effecting the unlocking of the guard closures preventing access to such machine components. The novel invention also relates to the interaction of the zero speed indicator signal with the insertion of a motion interference device if such a device is part of the safety guard system.

The novel inventions provide general methodologies and processes for testing zero speed indicators by taking advantage of the physical fact that every moving machine element has a "speed rundown phase" when it is required to stop for whatever reason. Each rundown phase whether it is forced to occur for test purposes as described herein, or occurs due to normal machine operations as also described herein, provides the opportunity to test the zero speed indicator attached to such an element for accuracy and reliability, giving in turn the opportunity to make the correct decision regarding the unlocking of the safety guards.

The various novel inventions disclosed herein were described in detail in the SUMMARY OF THE INVENTION section. Since these novel inventions represent general methodologies and processes applicable to machine systems with zero speed indicators, their mechanical embodiments are illustrated here by way of examples only, using schematic depictions of machine systems with zero speed indicators and testing arrangements. These are shown in FIGS. 2, 3, 5 and 7. The corresponding processes, executing the testing and decision making for such test arrangements, are illustrated by means of general testing process and decision making flow diagrams shown in FIGS. 4, 6, 9, 10 and 11. Finally, FIG. 1 depicts a schematic view of a machine control arrangement including a safety guard control setup and a zero speed indicator testing system, applicable to machine systems such as those illustrated by FIGS. 2, 3, 5, and 7 which would utilize the test process and decision flows of FIGS. 4, 6, 9, 10 and 11.

Thus, FIG. 1 shows schematically a machine control and testing system 10 which preferably includes one or more machines 11 (one being shown), a control unit 12, an input device 13, and an output device 14. The system 10 shall also include one or more detection units 15 (one being shown) including for example flow sensors, proximity sensors, heat detecting devices etc. to detect certain operating conditions of the system. Specifically, the detection Unit 15 will include any of a variety of known suitable devices for sensing and indicating the functioning and/or malfunctioning of the various components of the guard closures system. The instant application is directed to the zero speed indicator aspect of the guard closures system which indicators 16 determine if the speed of machine components 17 the access to which is controlled by guards 18, has achieved zero speed for the purpose of granting access to the guarded space. The detection unit 15 of the system 10 may communicate with the control unit 12 by transmission line 19 or any other suitable communication link. It will be recognized that the control unit 12, the input device 13, and output device 14 may be integral with the machine 11 or remote from the machine 11.

The guarding systems for the machine components 17 may also include an interlock such as 20A, 20B etc. for protecting each guard. Also illustrated are various locking mechanisms L that can be employed such as an integral locking mechanism or a separate locking device S schematically shown with respect to each guard. The various mechanisms are connected to the control unit by transmission lines 21A, 21B etc. The transmission lines may be one way or bi-directional communication links of any suitable type. The interaction between the guards, interlocks and locking devices are described in detail in the aforementioned applications Ser. Nos. 08/861,328 and 09/033,322 referred to herein and incorporated herein by reference. Thus the schematic testing system of FIG. 1 is not intended to limit the application of applicants invention but is merely intended to provide a general overview of systems that can be employed.

The control unit 12 can be set to test the guards and/or interlocks and/or zero speed detectors on any specified schedule, for instance, during each shift, hourly, daily weekly, or any other interval. Signal or warning indicators, can be placed wherever desired, for instance, adjacent to each guard, operating stations and main panels and be suitably activated in the event a guard and/or interlock and/or zero speed detector fails, to warn personnel of this condition.

In FIG. 1, the input device 11 of the system 10 is in communication with or coupled to the control unit 12. The input device 13 may include a keyboard, a keypad, or any other suitable input device. The input device 13 may allow a number of versatile control or scanning functions to be utilized. For example, the guards, interlocks and zero speed indicators may be continuously monitored or checked at preselected times. Alternatively, the frequency and duration of monitoring of all or a selected number of guards, interlocks and zero speed indicators may be initially preset and/or changed.

The output device 14 of the system 10 is also in communication with or coupled to the control unit 12. The output device 14 may generate a message or an alarm that can be visual audio, or whatever else is suitable, singly or in combination, when a malfunctioning guard system protective component, e.g., the interlock or zero speed indicator is detected. The output device 14 may include a display or monitoring panel that alerts an operator that a trouble or an alarm condition exists and may also indicate the location of the malfunctioning device in the environment.

The output device 14 may further display a message or otherwise identify what is being tested and where, what is bypassed for testing and what is not (see patent application Ser. Nos. 08/861,320 and 09/033,322) etc. and the corrective actions acquired. The output device 14 may be designed at any level of sophistication or complexity in order to process the information about the status of the guards, interlocks, zero speed indicators, etc. and to indicate that a problem exists with one or more of said devices.

The control unit 12 of the system 10 checks where feasible and directs the functioning and operation of all guards, interlocks, guard locks, zero speed indicators and interference devices as well as other machine controls. To execute these tasks the control unit 12 may include, for example, a program unit, a processing unit, a computer, a programmable logic controller, a microprocessor, etc. The control unit 12 can be commanded with any suitable operating system, and can be digital, analog, hardwired, etc., or combinations of these. The control unit 12 can be commanded to continuously monitor components of the guards' protective system and test the individual protective devices, such as the zero speed indicators in any sequence combination, at a preselected schedule, frequency, duration, or randomly.

As indicated previously, when the control unit 12 detects a malfunctioning guard protective component, e.g., an interlock or zero speed indicator, suitable alarms would be activated at the output device 14 and/or at other selected locations, and the control unit 12 may place the malfunctioning device in a maintenance standby mode as further described below. A message indicating a malfunctioning device may also be displayed on the output device 14 and elsewhere. The particular location of the guard, with the failed protective component of the machine 11 may further be identified.

For the purpose of the present invention the novel systems are directed to the testing of zero speed indicators that are used to indicate when the moving machine components being guarded are at zero speed so the guards can be opened without there being a hazard to personnel entering the guarded area. This testing would be directed by the control unit 12.

In particular the zero speed indicators 16 are connected via the transmission lines to the control unit 12 and detection unit 15, to activate indicators when the components 17 are at zero speed and the guards 18 can be unlocked to be opened. Per the present novel invention the control unit 12 is also programmed to periodically test the zero speed indicators, when the machine is running by uncoupling them from the moving machine components and allowing them to run down (FIGS. 2A, 2B and FIG. 3), or by testing the zero speed indicators when the machine components being guarded are in the run down phase of a stopping action of the components of the machine such as described by example with respect to FIG. 5 hereinafter in detail. If during the testing the zero speed indicator fails the test, the control unit can be programmed to a variety of ways including 1) to shut down the machine or 2) allow the machine to continue running while insuring that the relevant guard remains locked to continue to guard the machine components monitored by the faulty zero speed indicator.

In addition the controller 12 can be programmed to further provide for inserting an interference device when zero speed has been achieved (FIG. 8) to block the components being guarded from moving while the guard is open.

FIGS. 2A and 2B illustrate schematically a mechanical embodiment of a zero speed indicator assembly connected to the driving mechanism of a machine, shown here as a press, where the indicator assembly is to be tested in situ during running of the machine without its shutdown. The method illustrated here to accomplish the testing while the machine is running is that of temporarily detaching the indicator assembly in situ from the driving mechanism, in which uncoupled mode the indicator assembly can be tested while the machine can continue to operate.

Specifically, FIGS. 2A and 2B disclose a schematic illustration of a motion detector that is directly connected to a motor driven gear system that drives a crankshaft to which is secured a connecting rod and a press ram. Thus the motion of the detector is directly synchronized with the motion of the ram, which is the dangerous element of the press. As shown, the motor 24 drives the crankshaft 25 to which is secured a connecting rod 26 and ram 27 that is positioned to engage the die 28 through the action of the gear train 29. Located adjacent to the drive gear 30 of the gear train 29 is the motion detector assembly 32 that includes a detector 32' and gearing 31 that is normally engaged with and driven by the main gear 30. The motion detector 32' through gearing 31 is thus driven at a speed that is proportional to that of the crankshaft 25, and when the gearing 31 runs down to zero speed due to a machine stop action, the detector 32' will indicate that the crankshaft 25 has run down to zero speed.

The detector assembly 32 is equipped with an uncoupling/coupling mechanism 33 capable to detach the detector gear 31, and thus the detector assembly 32, from the drive gear 30 and to reattach it to the gear, while the gear 30 is running. When it is desired to test the motion detector 32' while the machine is running, the motion detector assembly 32 is temporarily detached in situ by the mechanism 33 from the drive train gear 30 as shown in FIG. 2B. In this isolated state the motion detector assembly 32 is allowed to freely run down to zero speed, or can be helped to run down to zero speed by a brake. It is monitored during this interval by a test device, means or method shown schematically at 34, which can be any suitable verification device or method including that recommended by the detector manufacturer, to establish if the detector 32' correctly determines and indicates zero speed. At the completion of the test, the motion detector assembly 32 with its gearing 31 is recoupled to the drive train gear 30 by means of the mechanism 33 to continue monitoring the ram motion.

It is to be noted that the motion detector can be separate from the run down component and be stationery but equipped to read the speed of the run down component even when the component is disengaged from the machine for the purpose of testing the detector while the machine is running.

The test execution process for the mechanical embodiment of FIGS. 2A and 2B and the decisions on the test outcomes are all illustrated in detail in the flow chart diagram of FIG. 4.

FIG. 3 is another illustration of a mechanical system embodiment for testing a zero speed indicator in situ while the machine is running but using a clutch/brake unit as the uncoupling mechanism to perform the indicator testing. Here, the machine is illustrated by a circular saw system.

Specifically, the embodiment of FIG. 3 shows schematically a continuously running saw 36 mounted on a power driven arbor shaft 38. Attached to the arbor shaft 38 is a clutch/brake unit 40 which operates a zero speed detector 42 via the drive shaft 44 and the belt drive unit 46. In this way the motion of the detector 42 is proportional to and is directly synchronized with the motion of the saw 36, which is the dangerous element of the machine. Thus, when the saw 36 runs down to zero speed due to a stop action of its arbor shaft 38, the detector 42 will indicate when zero speed has been achieved.

When it is desired to test the zero speed detector 42 while the saw 36 is running, the detector is temporarily uncoupled from the machine by declutching its timing belt drive shaft 44 from the saw driving arbor 38 using the clutch/brake unit 40. The brake of the clutch/brake unit 40 is then applied to the timing belt's shaft 44 to run down its motion to a stop to test the zero speed detector 42. During this phase, the detector 42 is monitored by a test device, means or method shown schematically as 48 to establish if the detector correctly determines and indicates zero speed. The tester 48 can employ any suitable verification device or method, including that recommended by the detector manufacturer. At the completion of the test, the detector 42 is recoupled to the saw arbor shaft 38 by the clutch/brake unit 40 to continue monitoring the speed status of the saw 36.

The test execution process for the mechanical embodiment of FIG. 3 and the decisions on the test outcomes are all illustrated in detail in the flow chart diagram of FIG. 4.

FIG. 4 described below is a flow diagram subroutine detailing the test execution process and decisions on test outcomes for testing the integrity and accuracy of zero speed indicators in mechanical systems of running machines in general, in which the test is performed while the machine is running and without stopping the machine, as is embodied in the present novel invention. As such, this flow diagram is also applicable to the example mechanical systems presented in FIGS. 2 and 3.

The subroutine of FIG. 4 is designated by the number 50 and is started by selecting a zero speed indicator to be tested at which time the test states are reset to start the test at 50A. At 50B the "zero speed indicator test on" informing devices are activated and at 50C there is applied a suitable testing device and/or method to the zero speed indicator's speed run down component for the purpose of testing the indicator. At 50D the zero speed indicator's run down component is to be uncoupled from the monitored machine component to initiate its speed run down without stopping the machine component or the machine. At 50E there will be an indication of whether the zero speed indicator did or did not uncouple. If the indicator did not uncouple, it is a testing failure and thus the indicator cannot be tested. This will be recorded at 50F. Following this at 50G an informing device indicating that the zero speed indicator did not uncouple and thus the indicator cannot be tested will be activated, and at 50H will be given a directive and an indication that the guard served by this zero speed indicator is not to be unlocked until the faults are corrected and the indicator and all associated tests have passed in situ. At 50I the necessary repair or replacement of faulty devices will be scheduled. At 50J a decision is made to 1) shut down the machine due to the failure or 2) to not shut down the machine and proceed to test another indicator at 50K. If the machine is to be shut down it will be done so at 50L and at 50M the "zero speed indicator test on" informing devices will be deactivated.

Returning now to 50E it follows that if the zero speed indicator did uncouple then at 50N the zero speed indicator will be monitored by the testing device or method of 50C to ascertain if the indicator correctly determines and indicates zero speed of its the speed run down component. At 50P it will be determined if the assigned monitoring time for the indicator has been exceeded.

The use of an assigned finite monitoring time, somewhat longer than the uncoupled indicator's run down time, is necessary in order to avoid an endless monitoring loop or an excessive test time, both of which indicate a failure of either the zero speed indicator or the testing. Thus, if at 50P it is determined that the monitoring time has been exceeded, it is a zero speed indicator or a testing failure and the informing device 50R will be activated indicating that the monitoring time has been exceeded (a failure). At 50H the directive and indication will be given that the guard served by this zero speed indicator is not to be unlocked until the faults are corrected and the indicator and all associated tests have passed in situ. This is followed as before by the action of block 50I, the decision block 50J, and the branch blocks 50I and 50M, or the decision block 50K.

If at 50P it is determined that the assigned monitoring time has not yet been exceeded, then at 50Q it will be indicated if zero speed has been achieved or not as monitored at 50N. If zero speed is not indicated at 50Q, then the process loops again through block 5ON and branch blocks 50P and 50Q. If zero speed is indicated at 50Q, then at 50S it will be noted if the zero speed indicator performed correctly or not.

If the zero speed indicator did not perform correctly 50T will record that the indicator failed the test. If the zero speed indicator passed the test then at 50U it will be so indicated. Whatever the test outcome, the indicator's speed run down component is then to be recoupled to the machine component it is assigned to monitor at 50V. At 50W it will be noted if the zero speed indicator recoupled or not and if it did not recouple then at 5OX a record will be made that the recoupling failed and a test outcome decision will be made at 50AA. If the indicator did recouple it will be so recorded at 50Y. At 50Z the testing device or method of 50C will be removed from the zero speed indicator's run down component and at 50AA the test outcome decision will be made if all tests have passed. If all tests have passed the "all tests passed" informing devices are activated at 50BB whereupon the process goes to decision block 50K. If all tests did not pass the "test failed" warning informing devices indicating what tests failed are activated at 50CC after which the system returns to 50H wherein the guard is not to be unlocked.

FIG. 5 illustrates schematically a mechanical embodiment of a zero speed indicator connected to the driving mechanism of a machine, shown here as a press requiring intermittent stop type of operations, wherein the indicator without uncoupling can be tested in situ each time the ram crank shaft is braked to a stop required by an intermittent task of the press, as well as during scheduled and unscheduled stop initiations of the press power drive itself.

In FIG. 5, the motor 52 drives the pulley system 53 which in turn rotates the flywheel 54. The flywheel is connected to a clutch and brake unit 56 through which the crankshaft 57 and associated connecting rod 58 is driven to reciprocate the ram 60. In this system is shown a zero speed indicator 62 that is connected to the crankshaft 57 through the timing belt 64. The indicator 62 is used to determine when a protective guard (not shown) can be unlocked to allow safe operator access to the dangerous space of the ram 60 and die 66 operation.

Any time the machine is declutched and braked to a stop at 56 due to an intermittent operation requirement of the ram 60, there is an opportunity to test in situ the reliability and accuracy of the zero speed indicator 62 by the schematically illustrated tester 68 during the speed run down phase of the stop without interruption of production. The tester 68 can be any suitable verification device or method including that recommended by the indicator manufacturer. Furthermore, whenever the press is shut down by control stops, emergency stops or power disconnects, there is the same opportunity to check or test in situ the reliability and accuracy of the zero speed indicator 62. Unlike the testing of the zero speed indicators during running of a machine as illustrated in, FIGS. 2, 3 and 4, the present testing, FIG. 5, being done during stop initiations requires no special means for uncoupling the zero speed indicator from its driving machine component.

If the indicator fails the test then the decision can be made not to permit the unlocking of the protective guard until a scheduled repair/replacement and retest have been performed. These and other decisions on the test outcomes as well as the test execution process for the mechanical embodiment of FIG. 5 are all illustrated in detail in the flow chart diagram of FIG. 6.

FIG. 6 described below is a flow diagram subroutine detailing the test execution process and decisions on test outcomes for testing the integrity and accuracy of zero speed indicators in mechanical systems of running machines in general, in which the test is performed during machine stop initiations, as is embodied in the present novel invention. As such, this flow diagram is applicable to the example mechanical system presented in FIG. 5.

The subroutine of FIG. 6 is designated by the number 70. As is indicated, such a subroutine for testing an individual zero speed indicator can be applied simultaneously to all relevant zero speed indicators of the machine required to be tested by the machine stop initiation. However, the test outcome results are specific to each zero speed indicator. The subroutine process starts at 70A where it is indicated that the speed run down of the monitored machine components has been initiated by the main routine controller At the start of the run down phase at 70B it is noted that three things occur in parallel. Specifically, at 70C a zero speed indicator is selected to be tested at which time the test states will be reset to the start of tests. At 70D the "zero speed indicator test on" informing devices are activated and at 70E will be applied a suitable testing device and/or method to the zero speed indicator's speed run down component for the purpose of testing the indicator. At 70I the indicator will be monitored by the testing device or method of 70E to establish if it correctly determines and indicates zero speed of its speed run down component. At 70G it will be determined if the assigned monitoring time for the indicator has been exceeded or not.

The use of an assigned finite monitoring time, somewhat longer than the uncoupled indicator's run down time, is necessary in order to avoid an endless monitoring loop or an excessive test time, both of which indicate a failure of either the zero speed indicator or the testing. Thus, if at 70G it is determined that the monitoring time has been exceeded, it is a zero speed indicator or a testing failure and the informing device 70H will be activated indicating that the monitoring time has been exceeded (a failure).

At 70I it will be directed that the guard closure served by the indicator is not to be unlocked until the faults are corrected and the indicator has passed the test in situ. If the assigned monitoring time at 70G has not been exceeded 70J determines if zero speed has been indicated and if not the system returns to 70F where it will again monitor if the indicator correctly determined the speed. If zero speed is indicated at 70J then the system proceeds to 70K which will indicate whether or not the indicator performed correctly. If the indicator did not perform correctly 70L will record that the indicator failed the test. If the indicator did pass the test this will be recorded at 70M. 70N indicates if the test passed or not and if it did not the "tests failed" warning informing devices are activated at 70P. From 70P the system leads to 70I which informs and directs the system that the guard closures are not to be unlocked. If the indicator passed the test then the "test passed" informing devices are activated at 70Q and at 70R the indicator testing device will be removed from the zero speed run down component. At 70S the "zero speed indicator test on" informing devices are deactivated after which the system returns to its main routine (FIG. 11) at 70T.

It has previously been noted that at 70P the test failed warning devices were activated. Then via step 70I we get to step 70U where the necessary replacement and/or repair would be scheduled and at 70V the indicator testing device would be removed from the zero speed indicator's run down component. At 70W the decision is made whether restarting of the machine components served by this failed indicator is to be permitted. If the decision is yes, then it is so communicated to its main routine (FIG. 11) at 70T, but if restarting of the machine components is to be prevented then at 70X it is so executed and the "zero speed indicator test on" informing devices will be deactivated at 70S.

FIG. 7 shows that combining methods and systems of this invention enables the testing of zero speed indicators in situ both during machine stop initiations and while the machine is running using a single test system.

Thus FIG. 7 shows the schematic mechanical system of FIG. 5 with the same interconnecting arrangement of its parts 52 through 68, as that of FIG. 5. However, here the timing belt 64 of the zero speed indicator 62 is connected to the crankshaft 57 by an intervening clutch/brake unit 70 by means of the timing belt drive shaft 74 in the manner shown in FIG. 3 (parts 40 and 44 of FIG. 3). With this arrangement, the zero speed indicator 62 of FIG. 7 can be tested in situ during scheduled and unscheduled stop initiations as described for FIG. 5, and it can also be tested in situ during running of the machine as described for FIG. 3. The test execution processes and decisions on outcomes would be those of FIG. 6 and FIG. 4 respectively.

FIG. 8 illustrates a schematic arrangement of a mechanical motion interference safety device of the type that may be used with plastic injection molding machines. Specifically, this embodiment incorporates a moving platen 76 to which is connected a safety bar 78 that has formed therein a number of recesses 80. When the schematically illustrated motion indicator 82 has signaled that zero speed has been achieved by the moving platen a motion blocking interference device 84 engages a recess 80 in the safety bar 78 to prevent movement of the platen 76. In this embodiment the interference device is a pawl 84 that is controlled by an actuating valve 85. The actuating valve operates in response to the motion detector 82 reaching zero speed to introduce fluid to the safety pawl actuating cylinder 86 to move the pawl 84 into a recess 80 to lock the movable platen 76 in position. Moving the pawl into locking engagement with the safety bar 78 is a precursor to allowing the unlatching of any interlocked or locked guard closure such as the gate 88 protecting the machine components. Closing the gate 88 after it has been allowed to open, reverses the operation of the pawl 84 allowing the moving platen 76 to operate again.

FIG. 8 is but one example of the use of a mechanical motion interference safety device. There are obviously many other machinery systems which can, will and do employ mechanical motion interference safety devices of various kinds.

FIG. 9 illustrates a flow diagram subroutine detailing the execution process and decisions on process outcomes for insertion of a motion interference safety device at speed rundown completion caused by machine stop initiations of a general machine. It therefore also applies to the example system of FIG. 8.

The subroutine of FIG. 9 is referred to by the number 90. At 90A the machine stop signal has been initiated and the relevant machine member is in the speed run down phase. At 90B using a tested and passed zero speed indicator the speed of the relevant machine member is monitored. At 90C it will be determined if the indicator signals that the machine member did or did not achieve zero speed. If it did not achieve it will be determined at 90D if the assigned monitoring time has been exceeded. If the monitoring time has not been exceeded the system returns to 90B. If the assigned monitoring time has been exceeded it is a failure then at 90E an informing device will be activated indicating that the monitoring time has been exceeded. Then at 90F it is directed that the guard closure is not to be unlocked until the faults are corrected. Following this at 90G there will be activated a warning informing device that the "interference device was not inserted". Subsequently at 90H the necessary repair or replacement of the faulty device will be scheduled. At 90I the motion blocking interference device is to be restored to its starting position if an attempt to insert it was made. At 90J will be decided whether to permit the restart of the relevant unblocked but locked guard protected machine components. If the components are to be allowed to restart this is done at 90K by the main routine of FIG. 11. If it is decided not to restart the relevant machine components the prevention will be executed at 90L.

Returning to 90C if it has been indicated that zero speed has been achieved then at 90M an attempt is made to insert the motion blocking interference device into the assigned machine location. At 90N it will be determined if the interference device can be inserted and if it cannot be inserted then 90F will signal that the guard closure should not be unlocked until the faults are corrected. If the interference device is inserted then at 90P the "insertion completed" informing device is activated and at 90Q permission is granted to unlatch the guard closure for the relevant blocked machine components whereupon the subroutine 90 returns at 90K to the tasks of the main routine of FIG. 11.

Attention is now directed to FIG. 10 which illustrates a flow diagram subroutine for checking the fulfillment of necessary conditions for unlatching a guard closure. This subroutine is indicated as 92 and at 92A the guard closure to be checked is identified. At 92B are selected the latest test, monitoring and probing results for the guard closure, its safeguarding devices and systems. Then at 92C it will be determined if the results satisfy the specified necessary conditions for unlatching the guard closures. If they do not then at 92D permission will not be granted to unlatch the guard closure until the faults are corrected. If permission is granted to unlatch the closure this is given at 92E and the subroutine is returned to its main routine (FIG. 11) at 92F. At 92D it is noted that permission is not granted to unlatch the guard closure and then at 92G there will be an indication that the necessary conditions are not satisfied and the "failed condition" informing devices will be activated. At 92H repair or replacement of the faulty devices will be scheduled after which there is a return at 92F to the subroutines main routine of FIG. 11.

It is to be noted that for the ultimate guard closure system the necessary conditions for unlatching the guard closure must include the following results: a) tests of the guard closure locks have been passed; b) tests on guard closures by force/displacement devices have been passed; c) tests on interlocks have been passed; d) tests on zero speed indicators have been passed; e) zero speed systems gives permission to unlatch the closure locks; f) tests on timers or delay devices have been passed; g) tests on interference systems have been passed; h) interference devices are fully deployed; i) test of testers have been passed and; j) machine power has been interrupted by control stop signals, emergency stop devices, or by power disconnects. Insofar as the details for accomplishing a), b) and c) are concerned reference is again made to the two applications Ser. Nos. 08/861,328 and 09/033,332, relating to such testing systems previously referred to.

Figures 2, 11B:
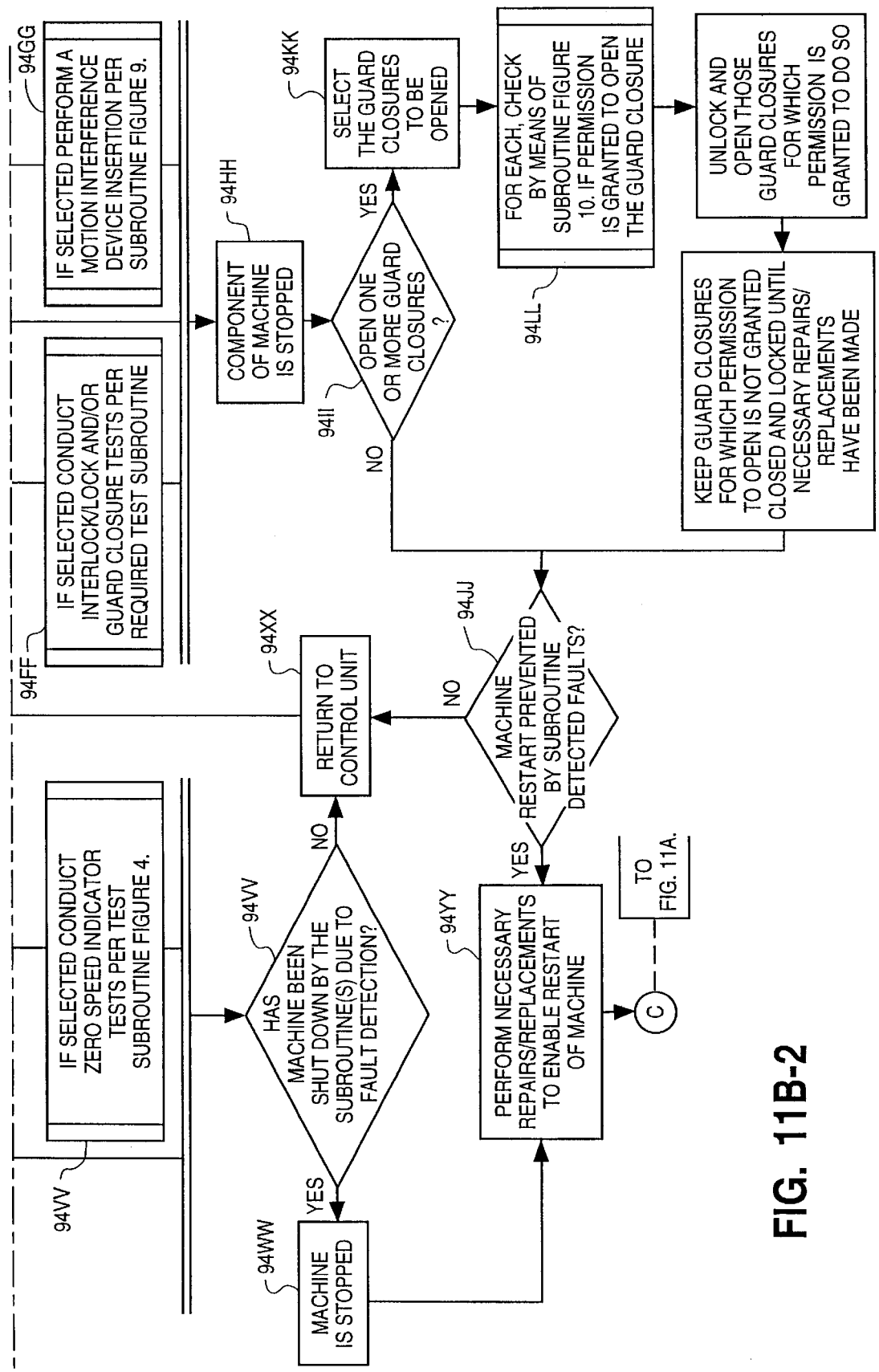

We now turn to FIGS. 11A and 11B where there is an example of a main routine for testing safeguarding devices and systems for guard closures which directs and executes the use of the process and decision subroutines, FIGS. 4,6,9 and 10 previously described. This system is designated as 94 and begins with the machine system control unit at 94A. At 94B it will be determined if the main disconnect which is to be closed or opened at 94C has been closed. If the main disconnect has not been closed the machine is stopped at 94D and at 94E after the machine motion has stopped the guards will be unlocked if required and permitted. Following this the routine will be ended at 94F. If the main disconnect is closed then 94G will indicate if the control is or is not in the start position if preceding this the start/stop control has been activated at 94H. If the control is not in the start position then as indicated at 94I the machine is stopped and the system returns to 94F. If the control is in the start position at 94G then the emergency stop controls are checked if they are activated at 94J. Here again, emergency or other stop controls are activated or deactivated at 94K. If the stop controls are activated the machine will be stopped at 94L. After the machine motion has stopped the guards will be unlocked if required and permitted at 94M.

If the stop controls are not activated then 94N will indicate whether input/output controls are enabled. If the input/output controls are not enabled then 94P will enable the machine input/output controls. If they are enabled then at 94Q it will be indicated if the machine controls other then for interlocks/locks are satisfied. If they are not satisfied then the machine will be stopped at 94S. If the machine controls are satisfied at 94Q the state of the interlock/locks sensors determination is done at 94T. If the sensors states are satisfied then at 94V it is determined if the interlock/lock bypass was enabled by its test subroutine. If the interlock/lock bypass is not enabled the machine will be stopped at 94S. If the interlock/lock bypass is enabled then at 94W it will be ascertained if the interlock/locks and or guard closure testing is in progress. If the testing is in progress the system returns to the machine system control unit at 94A. If the interlock/locks and/or guard closure testing is not in progress it will be determined if the machine is running at 94X. If the machine is running 94Y (FIG. 11B) will determine whether to initiate a machine component stop or not, or whether the machine is to be shut down or not. If the component is to be stopped or the machine is to be shut down then at 94Z (FIG. 11B) it will be decided whether to initiate and conduct tests of safeguarding devices and safeguarding systems for guard closures and/or for insertion of motion interference devices as a precursor to the stop/shut down. If it is not desired to initiate and conduct tests then the system returns to the control unit at 94AA. However, if tests are to be conducted then the corresponding test subroutines are selected at 94BB for the guard closures to be tested and/or have motion interference devices inserted. The machine rundown phase will then be initiated at 94CC.

Following 94CC various choices are available and made which in parallel with returning to the control unit at 94DD and then back to the machine system control unit at 94A. They are;, 1) select and conduct a zero speed indicator test per test subroutine of FIG. 6 at 94EE or 2) at 94FF select and conduct interlock/lock and/or guard closure tests per the required test subroutines that are discussed in detail in the aforementioned patent applications Ser. Nos. 08/861,328 and 09/033,322 that were incorporated herein reference; or 3) at 94GG select and perform a motion interference device insertion per the subroutine in FIG. 9. Following one of items 1, 2, or 3 hereinabove the machine component or machine is stopped at 94HH and subsequently at 94II a selection is made to open or not open one or more guard closures. If the choice is not to open a guard closure the system returns to 94JJ where it is determined whether the machine restart is prevented by the decision process of the subroutine that detected a fault. If is determined to open one or more guard closures the guard closure to be opened, is selected at 94KK and for each guard closure to be opened it is checked at 94LL by means of the subroutine of FIG. 10 if permission is granted to open the guard closure. Where permission has been granted the designated guard closures will be unlocked and opened at 94MM. At 94NN, action will be taken to assure that those guard closures for which permission to open has not been granted will remain closed and locked until necessary repairs or replacements have been made after which the system returns to 94JJ.

Returning to 94Y if a component stop or machine shut down is not made there will be a determination as to whether there will be an initiation and conducting of tests of safeguarding devices and safeguarding systems for guard closures at 94PP. If the decision is made not to conduct such tests there will be a return to the control unit at 94QQ. If tests are to be conducted a guard closure to be tested is selected along with the corresponding test subroutines at 94RR. Following this there are in parallel with returning to the control unit at 94TT two choices available; 1) conduct interlock/lock and/or guard closure test per required test subroutine at 94SS or 2) conduct zero speed indicator tests per test subroutine of FIG. 4 at 94UU. At 94VV there will be a determination if the machine has been shut down by any subroutine due to fault detection. If it has been shut down the machine will be stopped at 94WW or if not the system will be returned to the control unit at 94XX. If the machine is stopped the necessary repair and/or replacement elements to enable restart of the machine will take place at 94YY following which the system returns to 94F (see FIG. 11A), which completes the tasks of the main routine 94.

It remains to note that if the machine is not running at 94X then the guard closures will be closed and locked for machine start-up at 94ZZ and it will be determined at 95 whether or not the machine is to be started. If at 95 the machine is to be started, then at 95A it is checked if the machine is running or not. If not running, the system returns to 94S which completes the tasks of the main routine 94. If at 95A the answer is yes the machine is running, then the system goes to 94Y (FIG. 11B). If at 95 it is decided not to start the machine then the system goes to 94S, the end of the tasks of the main routine.

It is intended to cover by the appended claims all such embodiments that come within the true spirit and scope of the invention.

What is claimed:

1. The method of testing a zero speed indicator for a run down component of a machine while the machine is running under power consisting of the step of isolating the indicator from the machine and testing the zero speed indicating accuracy of the indicator.

2. The method of testing a zero speed indicator for a run down component of a machine while the machine is still running consisting of the step of uncoupling the component from the machine and testing the zero speed indicating accuracy of the indicator.

3. The method as set forth in claim 1 including the step of decelerating the movement of the indicators rundown component during testing to reduce the testing time.

4. The method of testing for zero speed indicating accuracy a zero speed indicator for a machine having intermittent motion wherein the machine is operated between a stop and start mode consisting of the step of testing the zero speed indicator while the machine is in a run down phase during the stopping mode thus testing the indicator without interrupting the operation or production capability of the machine.

5. Apparatus for testing for zero speed indicating accuracy of a zero speed indicator for moving components of a machine consisting of a motion detector connected to the moving components and moving at a speed proportional to that of the moving components, means for detaching the motion detector from the moving components, and means for testing the motion detector for zero speed indicating accuracy to determine the detector is performing correctly.

6. Apparatus as set forth in claim 5 in which the means for detaching the motion detector from the machine components consists of a declutching device.

7. Apparatus for testing for zero speed indicating accuracy of a zero speed indicator for moving components of a machine consisting of a motion detector assembly including a motion detector and a run down component moving at a speed proportional to that of the moving components, means for detaching the run down component from the moving components and means for testing the motion detector for zero speed indicating accuracy to determine if the detector is performing correctly.

8. Apparatus as set forth in claim 6 or 7 in which there is a braking device included to reduce the testing time.

9. The method as set forth in claim 1, 2, 4, or 5 in which the indicator controls the opening of a guard including the steps of recording and indicating that the indicator did or did not properly indicate zero speed, and if it did not properly indicate zero speed the guard should remain locked and should not be allowed to be opened and to schedule necessary repair or replacement, and if the indicator properly functions to record and indicate that the indicator passed the zero speed indicating test.

10. The method as set forth in claim 9 including the steps of activating suitable warning indicators and devices if the zero speed indicator failed the speed indicating test and schedule necessary repair and/or replacement of the failed indicator or then either postpone the repair or replacement for a later suitable time without shutting down the machine or shut down the machine due to test failures to perform the necessary repair and/or replacement of the failed indicator.

11. The method as set forth in claim 10 including the step of unlatching the guard when the machine is shut down so that repair or replacement of the failed indicator can take place.

12. The method of testing a zero speed indicator while a machine is running consisting of applying a suitable testing device to the indicator, uncoupling the indicator from the machine, permitting the indicator to run down and testing to see if the indicator uncoupled and if it did not uncouple the indicator will indicate that the indicator cannot be tested, a guard closure cannot be unlocked and necessary repair or replacement will be scheduled and if the indicator did uncouple then test the indicator to see if the indicator correctly determines and indicates zero speed during the run down phase.

13. The method as set forth in claim 12 in which after the indicator has passed all the indicator tests the indicator is recoupled and if recoupling occurs the indicator will so indicate and if the indicator failed to recouple this will be so indicated and the necessary repair or replacement will be scheduled.

14. The method of testing a zero speed indicator for a machine during the speed run down phases of the machine including those caused by machine stop initiations including the step of activating the zero speed indicator and applying a suitable testing device to the indicator to test the indicator and if the indicator fails the test any guard closure controlled by the indicator remains locked, the testing device is removed from the indicator and the necessary repair or replacement will be scheduled, and if the indicator is operating accurately the testing device is removed from the indicator.

15. The method as set forth in claim 12, 13, or 14 including the steps of activating suitable warning indicators and devices if the indicator failed to accurately indicate machine speed and then either postpone the repair or replacement for the later suitable time without shutting down the machine or shut down the machine due to test failures to perform the necessary repair and/or replacement of the failed indicator.

16. The method as set forth in claim 12 or 13 in which the testing of the indicator includes determining if any assigned monitoring times have been exceeded and if so the guard remains locked and then indicate that the test failed and the guard closure is not to be unlocked and the necessary repair or replacement will be scheduled.

* * * * *